United States Patent
Anan et al.

(10) Patent No.: US 8,942,413 B2
(45) Date of Patent: Jan. 27, 2015

(54) DIGITAL WATERMARK EMBEDDING APPARATUS, DIGITAL WATERMARK EMBEDDING METHOD, AND DIGITAL WATERMARK DETECTION APPARATUS

(75) Inventors: Taizo Anan, Kawasaki (JP); Kensuke Kuraki, Kawasaki (JP); Shohei Nakagata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 426 days.

(21) Appl. No.: 13/331,220

(22) Filed: Dec. 20, 2011

(65) Prior Publication Data

US 2012/0163653 A1   Jun. 28, 2012

(30) Foreign Application Priority Data

Dec. 28, 2010   (JP) .................................. 2010-293254

(51) Int. Cl.
  *G06K 9/00*  (2006.01)
  *G06K 9/36*  (2006.01)
  *H04N 19/467*  (2014.01)
  *H04N 21/8358*  (2011.01)

(52) U.S. Cl.
  CPC ...... *H04N 19/00557* (2013.01); *H04N 21/8358* (2013.01)
  USPC .......................................... 382/100; 382/232

(58) Field of Classification Search
  USPC ................. 382/100, 170, 232, 250, 255, 260; 380/51, 287; 713/176, 179; 725/118; 358/1.14, 3.25
  See application file for complete search history.

(56) References Cited

U.S. PATENT DOCUMENTS

| 6,725,372 B1 * | 4/2004 | Lewis et al. .................... 713/176 |
| 6,785,398 B1 * | 8/2004 | Shimizu et al. ............... 382/100 |
| 6,795,565 B2 * | 9/2004 | Wendt ........................... 382/100 |
| 7,356,700 B2 * | 4/2008 | Noridomi et al. ............. 713/176 |
| 8,121,830 B2 * | 2/2012 | Srinivasan et al. ............ 704/205 |
| 8,194,918 B2 * | 6/2012 | Das Gupta et al. ........... 382/100 |
| 8,359,205 B2 * | 1/2013 | Srinivasan et al. ............ 704/500 |

(Continued)

FOREIGN PATENT DOCUMENTS

| JP | 2008-278534 A | 11/2008 |
| WO | 2005/079072 A1 | 8/2005 |
| WO | WO-2007/102403 | 9/2007 |

OTHER PUBLICATIONS

Japanese Office Action mailed Sep. 30, 2014 for corresponding Japanese Application No. 2010-293254, with Partial English Translation, 6 pages.

*Primary Examiner* — Chan Park
*Assistant Examiner* — Mia M Thomas
(74) *Attorney, Agent, or Firm* — Fujitsu Patent Center

(57) ABSTRACT

A digital watermark embedding apparatus includes an interface circuit which acquires video data and digital watermark information, and a processor which embeds the digital watermark information into the video data. The processor is adapted to, for each symbol contained in the digital watermark information, set a time segment, cause the area of a watermark pattern formed by a plurality of pixels having a prescribed value, and superimposed on each image contained in the video data, to vary in periodic fashion over time in the time segment according to the value of the symbol contained in the digital watermark information, and correct, using the prescribed value, the value of each pixel contained in a region where each image in the video data and the watermark pattern corresponding to that image overlap each other.

13 Claims, 15 Drawing Sheets

(56) References Cited

U.S. PATENT DOCUMENTS

| | | | |
|---|---|---|---|
| 8,508,357 B2 * | 8/2013 | Srinivasan et al. | 340/534 |
| 8,712,094 B2 * | 4/2014 | Anan et al. | 382/100 |
| 8,806,558 B1 * | 8/2014 | Cassidy et al. | 725/118 |
| 2002/0076084 A1 * | 6/2002 | Tian et al. | 382/100 |
| 2003/0185417 A1 * | 10/2003 | Alattar et al. | 382/100 |
| 2004/0034778 A1 * | 2/2004 | Celik | 713/176 |
| 2004/0093498 A1 * | 5/2004 | Noridomi et al. | 713/176 |
| 2005/0213790 A1 * | 9/2005 | Rhoads et al. | 382/100 |
| 2005/0265576 A1 * | 12/2005 | Seong et al. | 382/100 |
| 2007/0003102 A1 * | 1/2007 | Fujii et al. | 382/100 |
| 2007/0016790 A1 * | 1/2007 | Brundage et al. | 713/176 |
| 2008/0149713 A1 * | 6/2008 | Brundage | 235/435 |
| 2008/0273741 A1 | 11/2008 | Fujii et al. | |
| 2009/0074242 A1 | 3/2009 | Yamamoto et al. | |
| 2010/0042843 A1 * | 2/2010 | Brunk et al. | 713/176 |
| 2010/0134278 A1 * | 6/2010 | Srinivasan et al. | 340/539.13 |
| 2010/0177891 A1 * | 7/2010 | Keidar et al. | 380/200 |
| 2011/0194726 A1 * | 8/2011 | Das Gupta et al. | 382/100 |
| 2014/0044355 A1 * | 2/2014 | Haritaoglu | 382/170 |

* cited by examiner

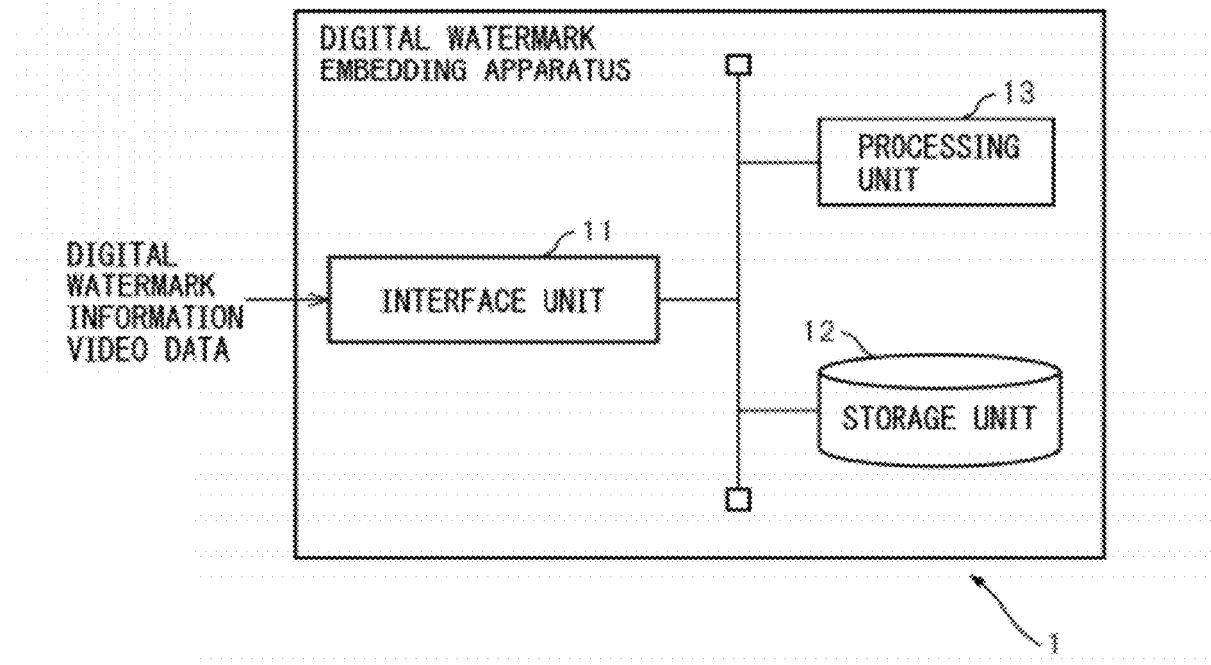
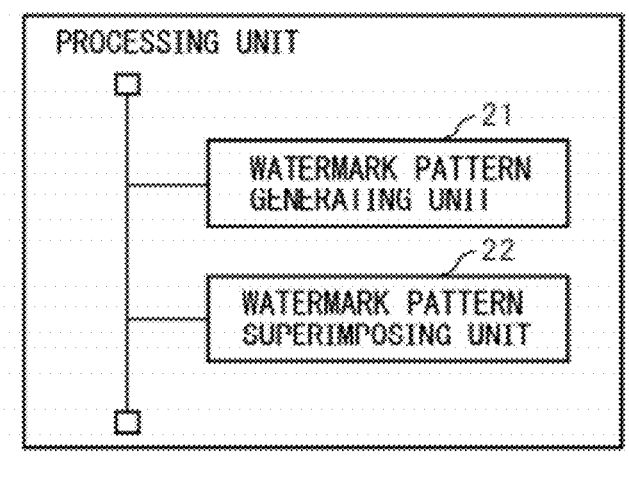

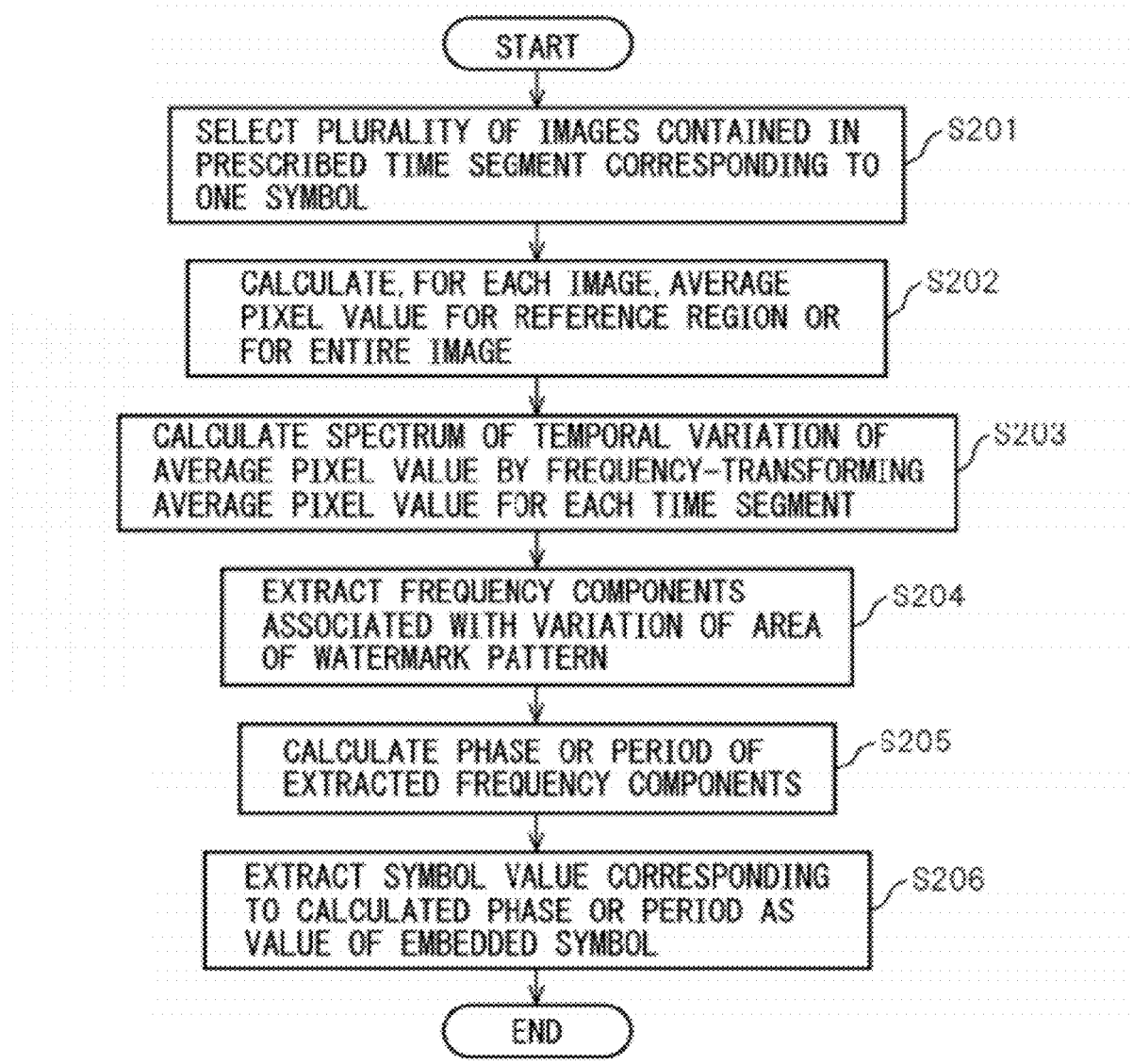

DIGITAL WATERMARK EMBEDDING APPARATUS, DIGITAL WATERMARK EMBEDDING METHOD, AND DIGITAL WATERMARK DETECTION APPARATUS

CROSS-REFERENCE TO RELATED APPLICATION

This application is based upon and claims the benefit of priority of the prior Japanese Patent Application No. 2010-293254, filed on Dec. 28, 2010, the entire contents of which are incorporated herein by reference.

FIELD

The embodiments discussed herein are related to a digital watermark embedding apparatus for embedding digital watermark information into video data, a digital watermark embedding method, a digital watermark embedding computer program, and a digital watermark detection apparatus for detecting digital watermark information embedded in video data.

BACKGROUND

Services for delivering video content such as movies via the Internet, etc., have become none common in recent years. Video content is encoded by Digital Rights Management (DRM) technology before delivery. Illegal copying or distribution of such video content is prevented due to DRM technology.

However, many incidents have occurred in which video content, illegally copied by capturing the video content displayed on a computer display or a television monitor by using an image capturing apparatus such as a camcorder, has been illegally distributed. Since the video content displayed on the display is not encoded it is difficult to prevent the distribution of the video content captured by video.

In view of the above, a technology has been developed that embeds information such as a viewer identification number into moving image data in the form of a digital watermark before delivering the video data. If the video data in which the digital watermark is embedded is illegally copied by capturing the displayed image using a camcorder, the digital watermark remains intact in the copied video data. Therefore, if the video data illegally copied by means of such analog capture is distributed, the identification number of the viewer that has made illegal use of the video content can be identified by detecting the digital watermark from the illegally copied video data. Accordingly, even when the video content illegally copied by means of analog capture is uploaded to a video uploading website, for example, the administrator of the video content can identify the illegal copy source from the information embedded in the uploaded video content.

It is preferable to embed an digital watermark in video data in such a manner that the digital watermark embedded in the video data is imperceptible to the viewer. To embed the digital watermark in the video data so as to be imperceptible to the viewer, it is preferable to reduce the variation in luminance that occurs due to the presence of the digital watermark, i.e., the difference in pixel value between the digital watermark embedded region and its peripheral region. However, if the difference in pixel value between the digital watermark embedded region and its peripheral region is small, the digital watermark may be lost when the video data in which the digital watermark is embedded is compressed using a standard such as Moving Picture Experts Group (MPEG). The digital watermark may also be lost due to image distortions, etc., that occur when the video data in which the digital watermark is embedded is captured using a camcorder or the like. On the other hand, if the difference in pixel value between the digital watermark embedded region and its peripheral region is large, such a problem does not occur, but in this case, the digital watermark becomes perceptible to the viewer. That is, there is a tradeoff between the degree to which the pixel value can be made to spatially change due to the presence of the digital watermark and the degree to which the digital watermark can be made robust. To solve this tradeoff problem, various digital watermarking technologies have been invented (for example, refer to International Patent Publication No. 2007/102403).

A digital watermark embedding apparatus disclosed in International Patent Publication No. 2007/102403, for example, embeds information as a digital watermark into an input signal having dimensions equal to or greater than N. This digital watermark embedding apparatus generates an (N−1)-dimensional pattern based on the embedding information, generates an N-dimensional embedding pattern by modulating a periodic signal in accordance with values on the (N−1)-dimensional pattern, and superimposes the embedding pattern on the input signal.

However, in the case of the technology disclosed in International Patent Publication No. 2007/102403, the luminance of the entire embedding pattern changes. As a result, if an image with uniform brightness and with little temporal variation, such as the sky, is contained in the region where the embedding pattern is embedded, the moving image in which the digital watermark is embedded may be perceived as if the image were flickering. Furthermore, the boundary between two regions with different embedded values may become noticeable. This can lead to a degradation of the picture quality of the moving image in which the digital watermark is embedded.

SUMMARY

According to one embodiment, there is provided a digital watermark embedding apparatus. The digital watermark embedding apparatus includes an interface unit which acquires video data and digital watermark information, and a processing unit which embeds the digital watermark information into the video data. The processing unit is adapted to cause the area of a watermark pattern formed by a plurality of pixels having a prescribed value, and superimposed on each image contained in the video data, to vary the area of the watermark pattern in periodic fashion over time according to the value of a symbol contained in the digital watermark information, and correct the value of each pixel contained in a region where each image in the video data and the watermark pattern corresponding to that image overlap each other, by using the prescribed value that the corresponding pixel in the watermark pattern has.

According to another embodiment, there is provided a digital watermark detection apparatus. The digital watermark detection apparatus includes an interface unit which acquires video data in which digital watermark information is embedded, and a processing unit which detects the digital watermark information embedded in the video data. The processing unit is adapted to calculate, for each image contained in the video data, an average pixel value for the entire image or for a reference region that contains a watermark pattern whose area varies in periodic fashion over time with a phase or period that matches the value of a symbol contained in the digital watermark information; calculate a spectrum depicting how the average pixel value varies over time, by frequency-transforming a set of the average pixel values contained in a time segment corresponding to one symbol and arranged in time series order; and obtain the value of the symbol by extracting from the spectrum a frequency component corresponding to the periodic variation of the area of the watermark pattern and by calculating from the frequency component the phase or period of the periodic variation of the area of the watermark pattern.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating in simplified form the configuration of a digital watermark embedding apparatus according to one embodiment.

FIG. 2 is a block diagram illustrating the functions that a processing unit implements, according to one embodiment, in order to embed digital watermark information into video data.

FIG. 17 is an operation flowchart illustrating a digital watermark detection process which is controlled by a computer program executed on the processing unit in the digital watermark detection apparatus.

DESCRIPTION OF EMBODIMENTS

Figure 3:
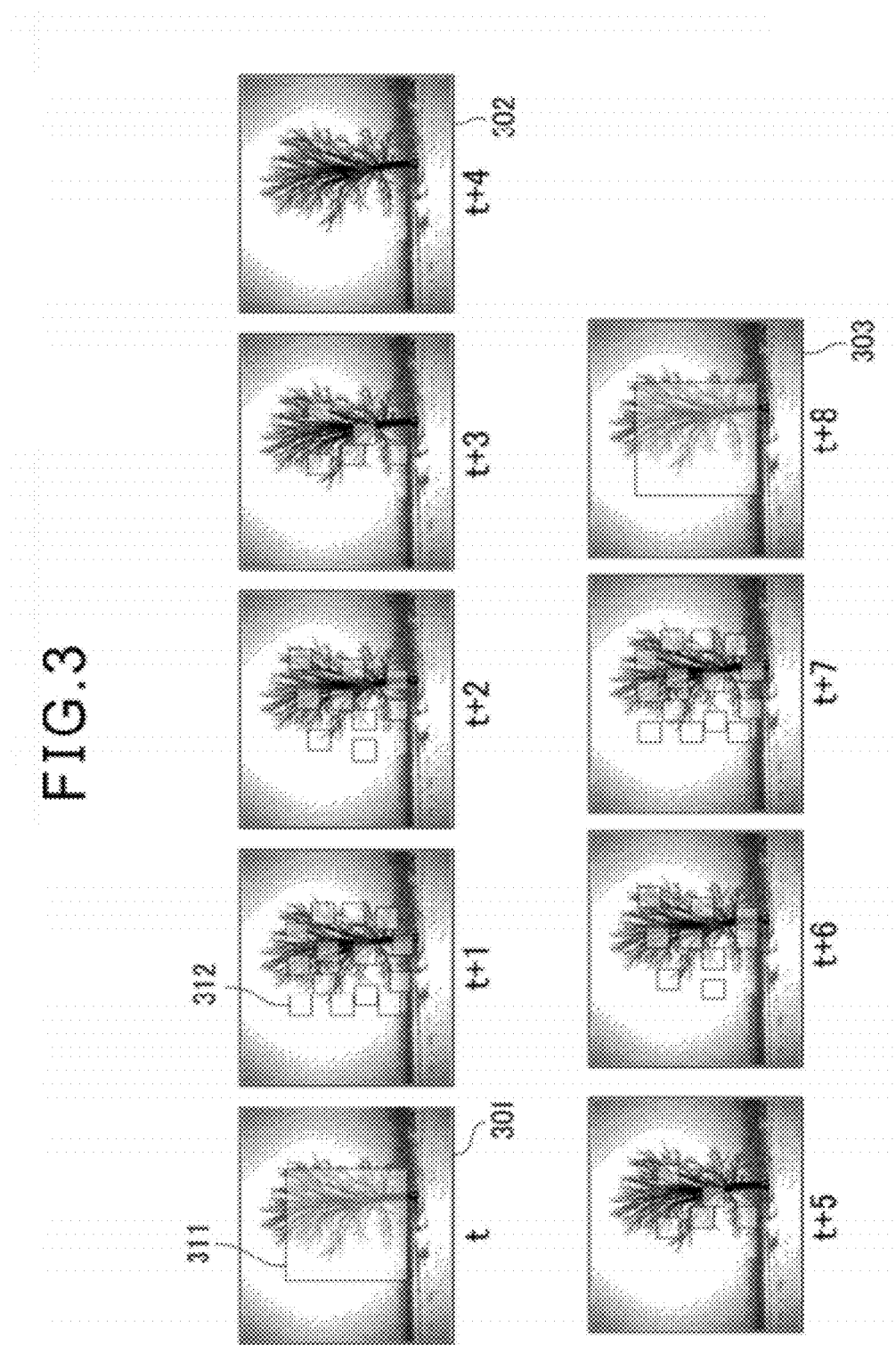
FIG. 3 is a diagram illustrating one example of the temporal change of a watermark pattern over one period.

A digital watermark embedding apparatus will be described below with reference to the drawings. According to the digital watermark embedding apparatus disclosed herein, the area of a watermark pattern formed from a set of pixels having a specific value is varied over time, thereby causing the average pixel value of a region where the watermark pattern is superimposed to vary over time according to the value of a symbol contained in the embedded digital watermark information.

Each image contained in video data may be either a frame or a field. The frame refers to one complete still image contained in the video data, while the field refers to a still image formed by extracting data only in the odd-numbered lines or even-numbered lines from the frame.

FIG. 1 is a diagram illustrating in simplified form the configuration of a digital watermark embedding apparatus according to one embodiment. The digital watermark embedding apparatus 1 includes an interface unit 11, a storage unit 12, and a processing unit 13. The digital watermark embedding apparatus 1 embeds digital watermark information acquired via the interface unit 11 into the video data.

The interface unit 11 includes a video signal interface for connecting the digital watermark embedding apparatus 1, for example, to a moving image input device such as a camcorder (not depicted) or an image display device such as a liquid crystal display (not depicted), and a control circuit for the video signal interface. Alternatively, the interface unit 11 may include a communication interface for connecting the digital watermark embedding apparatus 1 to a communication network conforming to a communication standard such as the Ethernet (registered trademark), and a control circuit for the communication interface. Further alternatively, the interface unit 11 connects the digital watermark embedding apparatus 1 to an antenna for receiving video data delivered via a wireless link, and includes a circuit for decoding the video data received via the antenna.

The interface unit 11 acquires video data from the moving image input device or via the communication network or the antenna, and passes the video data to the processing unit 13.

The interface unit 11 may further include an interface circuit conforming to a bus standard such as Universal Serial Bus, in order to connect a user interface device, such as a keyboard or a mouse, to the digital watermark embedding apparatus 1. Then, from a user interface device or via the communication network, the interface unit 11 acquires data to be embedded as the digital watermark information into the video data, and passes the acquired data to the processing unit 13.

The digital watermark information contains at least one identification number selected from among the identification number of the viewer, the identification number of the video data provider, and the identification number of the video reproducing apparatus in which the digital watermark embedding apparatus 1 is incorporated. In this patent specification, one of the plurality of digits or characters constituting the viewer's identification number, etc., contained in the digital watermark information, for example, one bit, is taken as the symbol. Accordingly, the symbol contained in the digital watermark information has one of a plurality of predetermined different values. For example, if the symbol contained in the digital watermark information is a bit, the symbol has a value "0" or "1".

The interface unit 11 receives the digital watermark-embedded video data from the processing unit 13, and outputs the digital watermark-embedded video data to the image display device such as a liquid crystal display. Alternatively, the interface unit 11 may transmit the digital watermark-embedded video data to other apparatus connected to the digital watermark embedding apparatus 1 via the communication network.

The storage unit 12 includes at least one device selected, for example, from among a semiconductor memory device, a magnetic disk device, and an optical disk device. The storage unit 12 stores a computer program to be executed on the digital watermark embedding apparatus 1 and various kinds of parameters to be used in order to embed the digital watermark information. Further, the digital watermark information and one or more images contained in the video data in which the digital watermark information is yet to be embedded may be temporarily stored in the storage unit 12 until the digital watermark-embedded video data is created by the processing unit 13. The storage unit 12 may further store the video data in which the digital watermark information is embedded.

The processing unit 13 includes one or a plurality of processors, a memory circuit such as a random access memory, and their peripheral circuitry. The processing unit 13 controls the entire operation of the digital watermark embedding apparatus 1.

The processing unit 13 embeds the digital watermark information into the video data by superimposing on each image in the video data a watermark pattern which is a set of pixels having a specific value and the area of which varies in periodic fashion over time according to the value of the symbol contained in the digital watermark information.

FIG. 2 is a block diagram illustrating the functions that the processing unit 13 implements in order to embed the digital watermark information into the video data. The processing unit 13 includes a watermark pattern generating unit 21 and a watermark pattern superimposing unit 22. These units constituting the processing unit 13 are functional modules implemented by executing a computer program on the processor incorporated in the processing unit 13. Alternatively, the watermark pattern generating unit 21 and the watermark pattern superimposing unit 22 may each be mounted as a separate operational circuit in the digital watermark embedding apparatus 1.

The watermark pattern generating unit 21 generates the watermark pattern to be embedded in each image in accordance with the value of the symbol to be embedded. In the present embodiment, the watermark pattern is a set of one or more watermark blocks. Each watermark block includes one or a plurality of pixels and has a rectangular shape, for example. Alternatively, each watermark block may be circular, semicircular, or triangular in shape. Each pixel contained in the watermark block has a specific value other than "0". In the present embodiment, the specific value is used to correct the luminance value of the corresponding pixel in the image on which the watermark pattern is superimposed. The watermark pattern generating unit 21 increases and decreases the number of watermark blocks in periodic fashion over time. The area of the watermark pattern increases as the number of watermark blocks increases. In accordance with the value of the symbol to be embedded, the watermark pattern generating unit 21 varies the phase or period of the periodic temporal variation of the area of the watermark pattern. As a result, the average pixel value of a reference region defined as a watermark pattern-containing region over the entire image or in a portion of the image increases and decreases periodically in like manner, thus periodically varying the phase or period of the temporal variation of the average pixel value of the reference region.

FIG. 3 is a diagram illustrating one example of the temporal change of the watermark pattern over one period. In the illustrated example, each pixel in each of the watermark blocks contained in the watermark pattern has a positive value, for example, "2" as the specific value. Each watermark block therefore manifests itself in the form of a spotlight; as a result, when the pixels contained in the watermark pattern are superimposed, the value of the superimposed pixels becomes higher than the original pixel value.

FIG. 3 depicts nine temporally successive images from time t to time (t+8). A rectangular watermark pattern 311 is superimposed on the image 301 at time t. Then, as the number of watermark blocks 312 decreases over the time interval from time t to time (t+4), the area of the watermark pattern superimposed on the image decreases. Then, the watermark pattern is lost from the image 302 at time (t+4). After time (t+4), the area of the watermark pattern begins to increase until the area of the watermark pattern again reaches a maximum in the image 303 at time (t+8).

Figure 4:
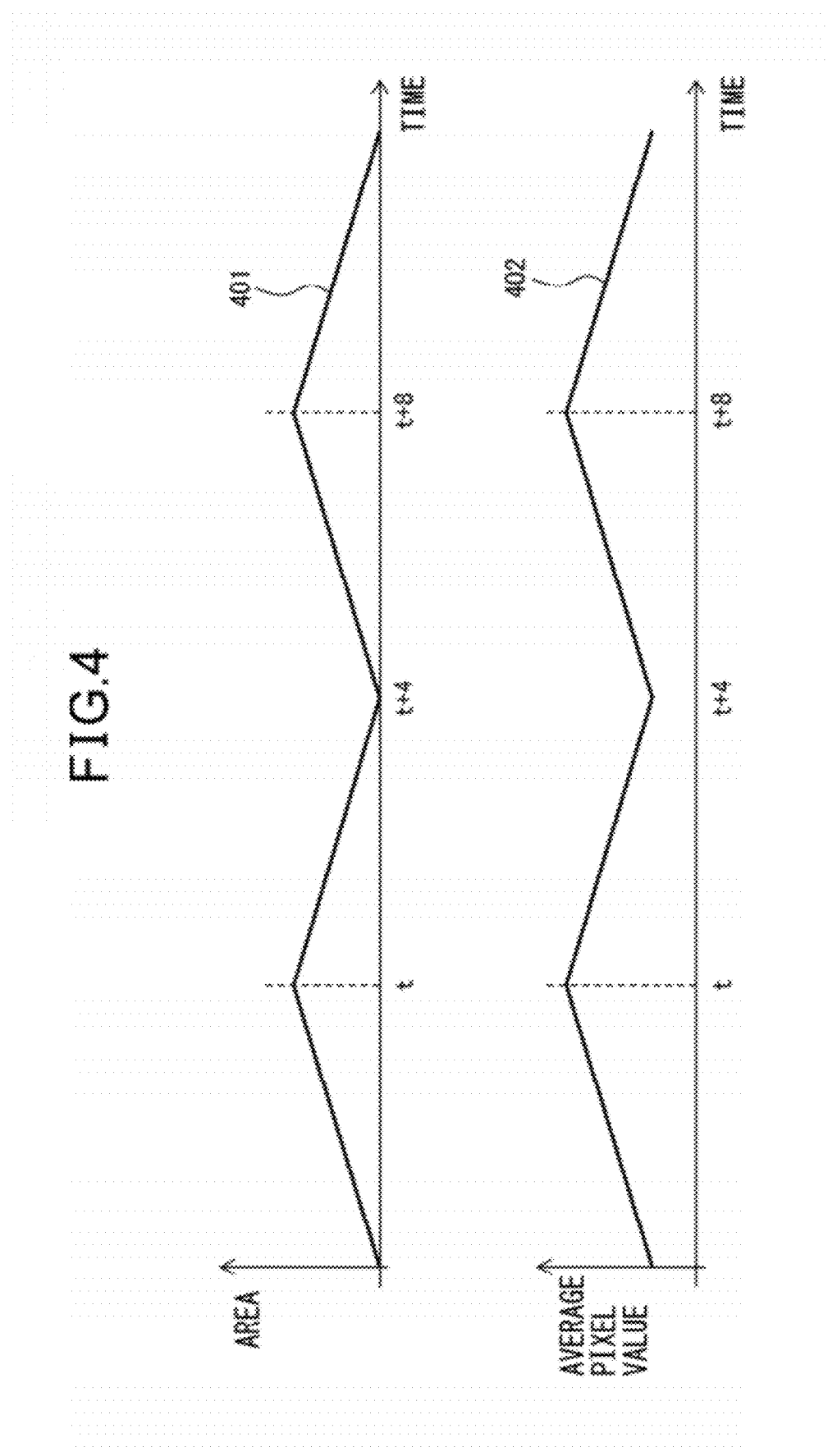
FIG. 4 is a graph illustrating the variation over time of the average pixel value in a reference region in corresponding relationship to FIG. 3.

FIG. 4 is a diagram of graphs illustrating, in corresponding relationship to FIG. 3, the relationship between the variation over time of the area of the watermark pattern and the variation over time of the average pixel value in the reference region. In the upper graph of FIG. 4, the abscissa represents the time, and the ordinate represents the area of the watermark pattern. Graph 401 depicts how the area of the watermark pattern varies over the time interval from time t to time (t+8). On the other hand, in the lower graph, the abscissa represents the time, and the ordinate represents the pixel value. Graph 402 depicts how the average pixel value of the reference region varies over the time interval from time t to time (t+8). For ease of understanding, it is assumed that the object in each image is stationary.

As depicted by the graph 401, the area of the watermark pattern varies in a triangular-wave fashion over the time interval from time t to time (t+8). As earlier noted, in the illustrated example, each pixel in the watermark pattern has a positive value. As a result, as depicted by the graph 402, the average pixel value of the reference region decreases as the area of the watermark pattern decreases, and increases as the area of the watermark pattern increases. Accordingly, the average luminance value also varies over time in a triangular-wave fashion, and the phase of the triangular wave representing the variation of the average pixel value is identical with the phase of the triangular wave representing the variation of the area of the watermark pattern.

Figure 5:
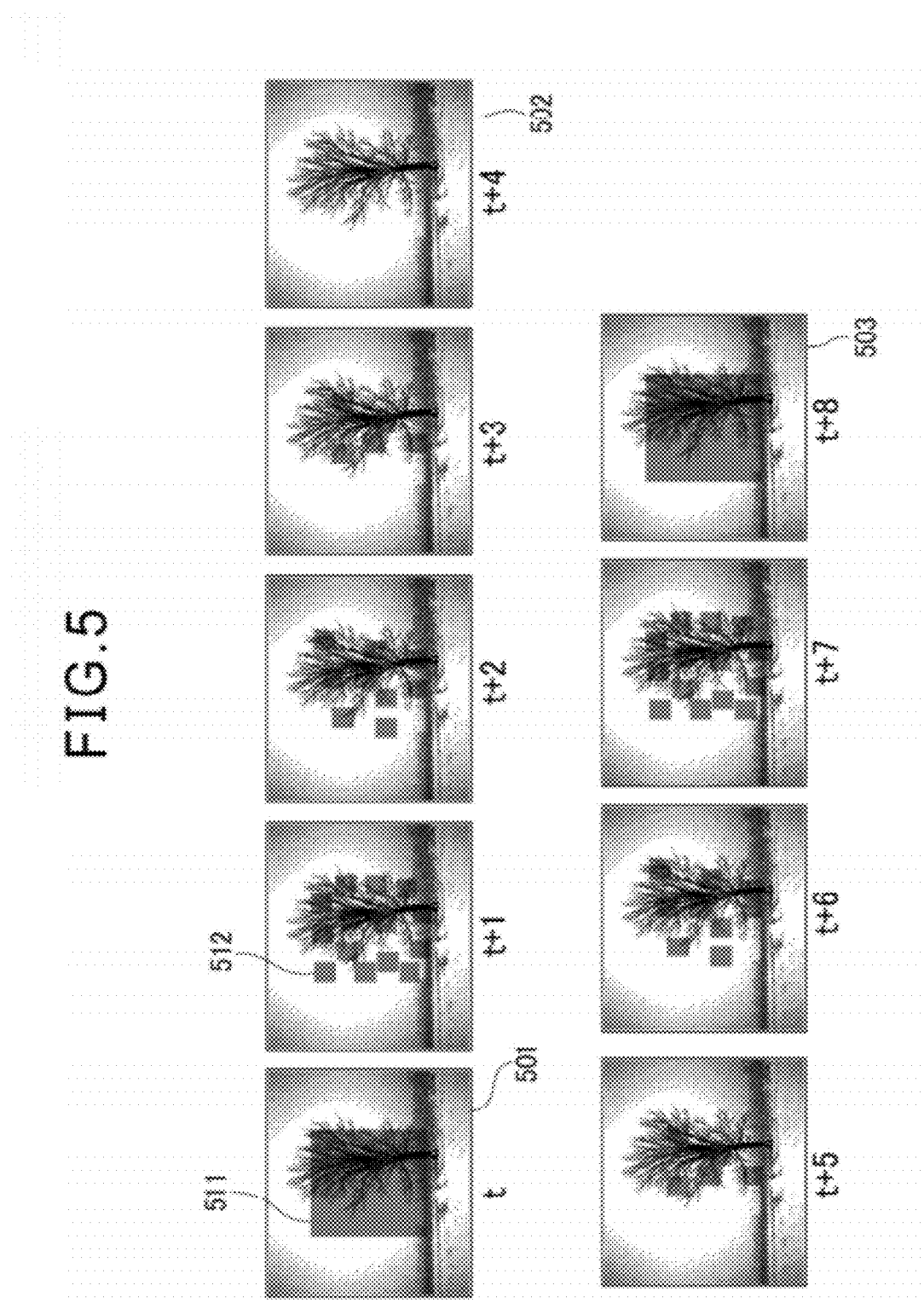
FIG. 5 is a diagram illustrating another example of the temporal change of the watermark pattern over one period.

FIG. 5 is a diagram illustrating another example of the temporal change of the watermark pattern over one period. In the illustrated example, each pixel contained in the watermark pattern has a negative value, for example, "−2" as the specific value. Each watermark block therefore manifests itself in the form of a shaded block; as a result, when the pixels contained in the watermark pattern are superimposed, the value of the superimposed pixels becomes lower than the original pixel value.

FIG. 5 depicts nine temporally successive images from time t to time (t+8). A rectangular watermark pattern 511 is superimposed on the image 501 at time t. Then, as the number of watermark blocks 512 decreases over the time interval from time t to time (t+4), the area of the watermark pattern superimposed on the image decreases. Then, the watermark pattern is lost from the image 502 at time (t+4). After time (t+4), the area of the watermark pattern begins to increase until the area of the watermark pattern again reaches a maximum in the image 503 at time (t+8).

Figure 6:
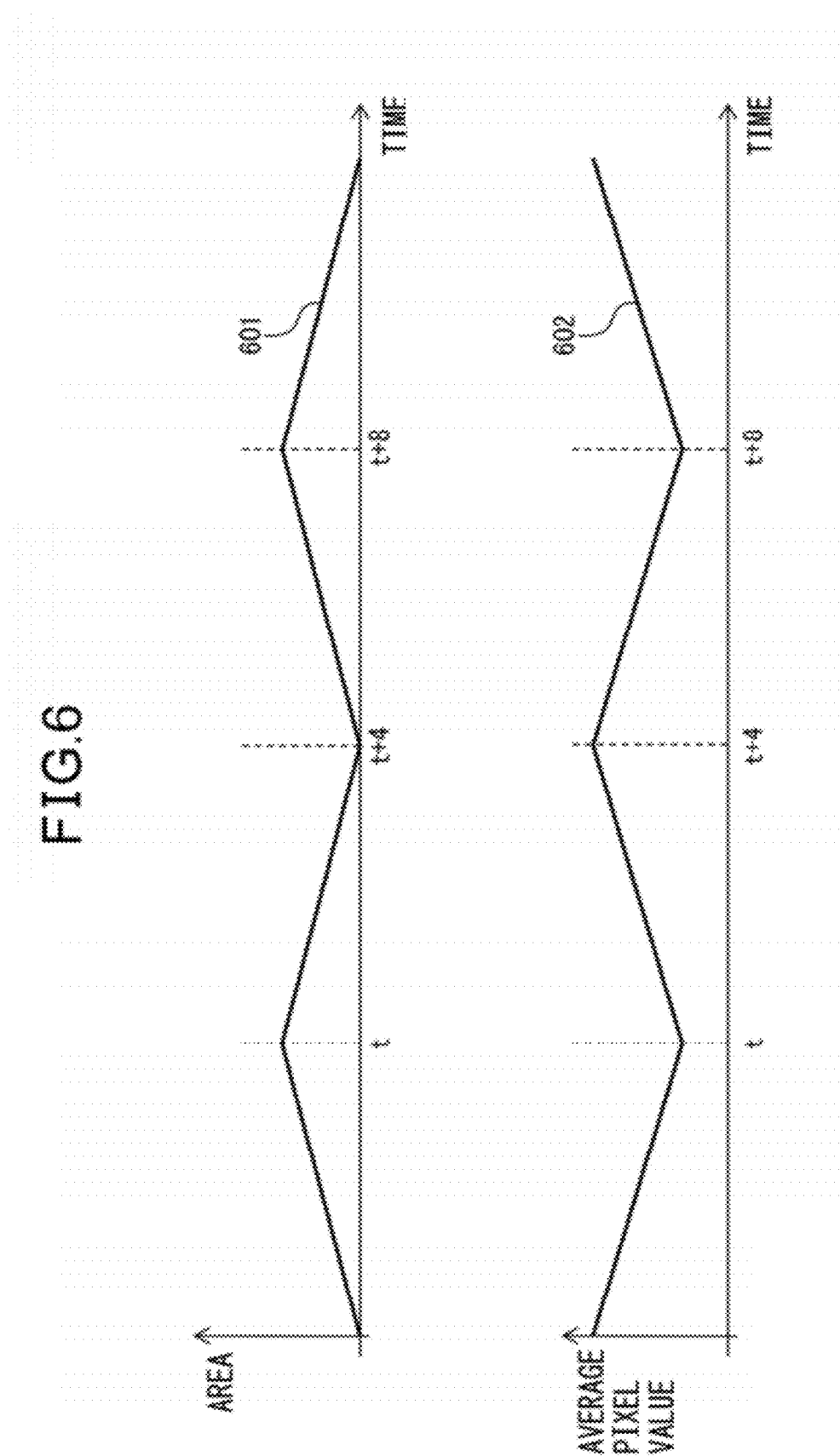
FIG. 6 is a graph illustrating the variation over time of the average pixel value in the reference region in corresponding relationship to FIG. 5.

FIG. 6 is a diagram of graphs illustrating, in corresponding relationship to FIG. 5, the relationship between the variation over time of the area of the watermark pattern and the variation over time of the average pixel value in the region containing the watermark pattern. In the upper graph of FIG. 6, the abscissa represents the time, and the ordinate represents the area of the watermark pattern. Graph 601 depicts how the area of the watermark pattern varies over the time interval from time t to time (t+8). On the other hand, in the lower graph, the abscissa represents the time, and the ordinate represents the pixel value. Graph 602 indicates how the average pixel value of the reference region varies over the time interval from time t to time (t+8).

As depicted by the graph 601, the area of the watermark pattern varies in a triangular-wave fashion over the time interval from time t to time (t+8). In the illustrated example, each pixel in the watermark pattern has a negative value. As a result, as depicted by the graph 602, the average pixel value of the reference region increases as the area of the watermark pattern decreases, and decreases as the area of the watermark pattern increases. Accordingly, the average pixel value also varies over time in a triangular-wave fashion, and the phase of the triangular wave representing the variation of the average pixel value is reversed relative to the phase of the triangular wave representing the variation of the area of the watermark pattern.

Figure 7:
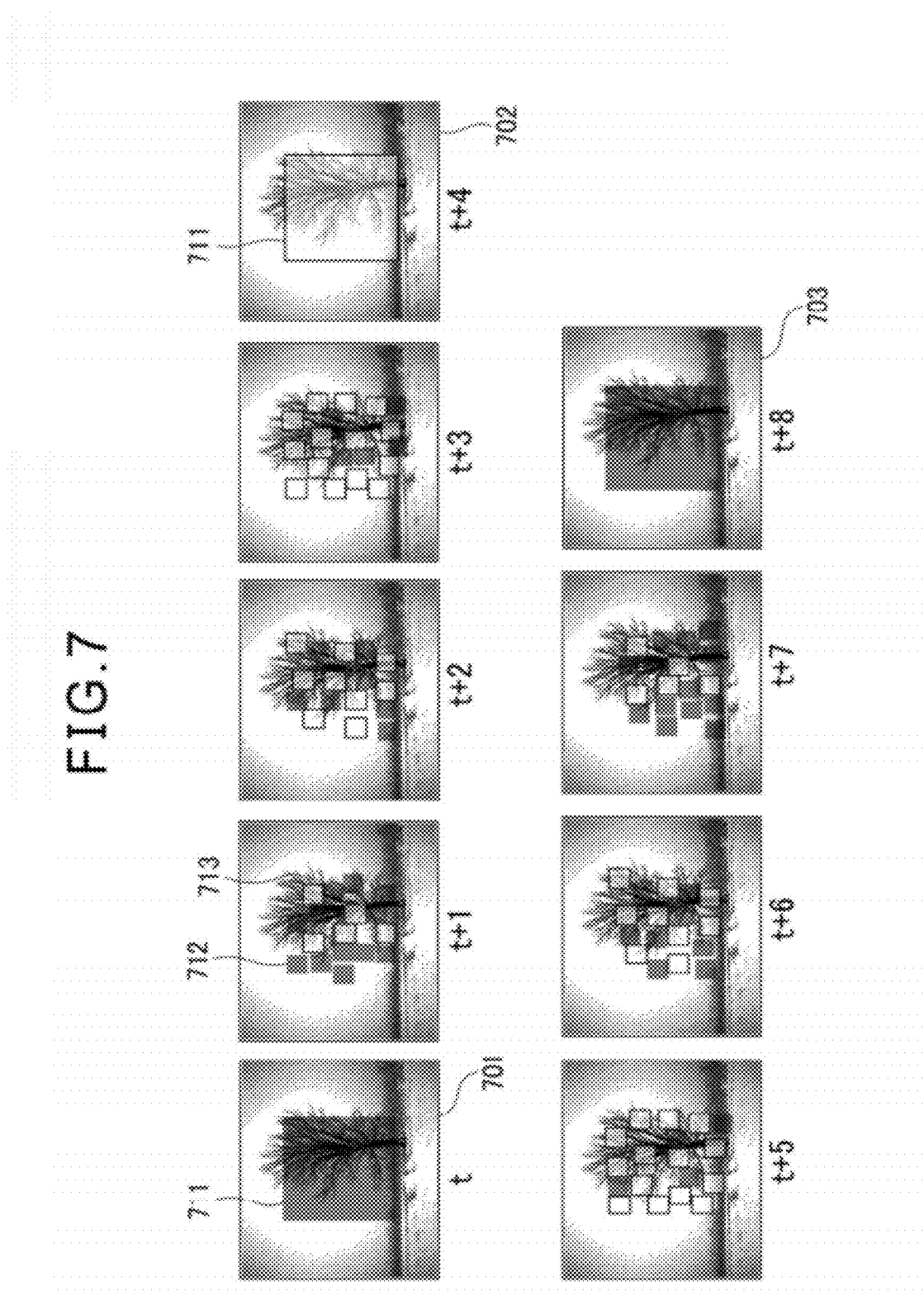
FIG. 7 is a diagram illustrating still another example of the temporal change of the watermark pattern.

FIG. 7 is a diagram illustrating still another example of the temporal change of the watermark pattern. In the illustrated example, every pixel in each of the watermark blocks contained in the watermark pattern has a value, for example, either "2" or "−2", as the specific value. However, in this example also, the watermark pattern to be superimposed on each image is determined so that the average pixel value of the reference region varies over time in a triangular-wave fashion, just like the case of the watermark pattern depicted in FIG. 5.

FIG. 7 depicts nine temporally successive images from time t to time (t+8). A rectangular watermark pattern 711 is superimposed on the image 701 at time t. Each pixel contained in the watermark pattern 711 has a negative value, and the entire watermark pattern 711 therefore manifests itself in the form of a shaded pattern. Then, the proportion of the number of spotlight-like watermark blocks 713 having positive values to the number of shaded watermark blocks 712 having negative values gradually increases over the time interval from time t to time (t+4). Then, in the image 702 at time (t+4), the entire watermark pattern 711 manifests itself in the form of a spotlight-like pattern. As a result, the average pixel value of the reference region increases over the time interval from time t to time (t+4). After time (t+4), the proportion of the number of spotlight-like watermark blocks 713 having positive values to the number of shaded watermark blocks 712 having negative values gradually decreases until the entire watermark pattern again manifests itself in the form of a shaded pattern in the image 703 at time (t+8).

As described above, as an example, the value of the symbol to be embedded in the video data is represented by the phase of the temporal variation of the average pixel value in the reference region. In this case, the watermark pattern generating unit 21 determines the area of the watermark pattern, for example, for the first image contained in a prescribed time segment in which a plurality of images are contained and in which one symbol is embedded. Then, for the second and subsequent images contained in that time segment, the watermark pattern generating unit 21 determines the area of the watermark pattern to be superimposed on each image so that the average pixel value of the reference region varies over time in a triangular-wave fashion. Then, the watermark pattern generating unit 21 determines the number of watermark blocks contained in the watermark pattern to be superimposed on the image of interest, by dividing the area of the watermark pattern determined for that image by the area of one watermark block. The prescribed time segment is chosen to be equal, for example, to one to several times the period of the temporal variation of the area of the watermark pattern.

The watermark pattern generating unit 21 determines the watermark pattern to be superimposed on the image of interest so that the shape of the watermark pattern differs from the shape of the watermark pattern superimposed on the image immediately preceding the image of interest. In this case, it is preferable to determine the shape of the watermark pattern so that one of the two watermark patterns superimposed on the two temporally successive images, respectively, will not be contained in the other of the patterns. For example, as depicted in FIGS. 3, 5, and 7, it is preferable that the watermark pattern generating unit 21 determines the arrangement of the watermark blocks to be superimposed on the image of interest so that the arrangement is uncorrelated with the arrangement of the watermark blocks in the images before and after the image of interest. This makes the watermark pattern superimposed on each image not readily perceptible to the viewer, because the position of the watermark block changes randomly as the time elapses.

It is further preferable that the watermark pattern generating unit 21 determines the arrangement of each watermark block so that the area of the watermark blocks contained in any particular portion of the watermark pattern region when the area of the watermark pattern becomes maximum also varies over time in a triangular-wave fashion. This would make it possible for the digital watermark detection apparatus, to be described later, to detect the variation in the area of the watermark pattern even when attention is focused only on a portion of the watermark pattern region.

For example, the region where the watermark pattern is superimposed when the area of the watermark pattern becomes maximum is divided into N sub-blocks (N is an integer not smaller than 2) each having an area not smaller than the area of one watermark block. The sub-blocks are sequentially numbered starting at 1 and ending at N, for example, in ascending order in raster scan order. Then, the watermark pattern generating unit 21 determines the number of the sub-block in which each watermark block is to be placed, by taking the value of the k-th element in a random sequence each of whose elements outputs a value that falls within the range of 1 to N (here, 1≤k≤m where m represents the total number of watermark blocks to be superimposed on the image of interest and is defined by m≤N). By using different random sequences for different images, the watermark pattern generating unit 21 can determine the arrangement of the watermark blocks to be superimposed on the image of interest so that the arrangement is uncorrelated with the arrangement of the watermark blocks in the images before and after the image of interest.

Alternatively, one or more watermark patterns among which the arrangement of the watermark blocks differs from one another may be stored in advance in the storage unit 12 for each watermark pattern area. Then, from among the watermark patterns corresponding to the area of the watermark pattern to be superimposed on the image of interest, the watermark pattern generating unit 21 may select one watermark pattern, for example, in accordance with a prescribed order or by using a random sequence. The prescribed order here is, for example, the ascending order or descending order of the numbers assigned to the watermark patterns.

Further alternatively, the watermark pattern generating unit 21 may determine the shape of the watermark pattern to be superimposed on each image, by using a method other than described above.

Figure 8:
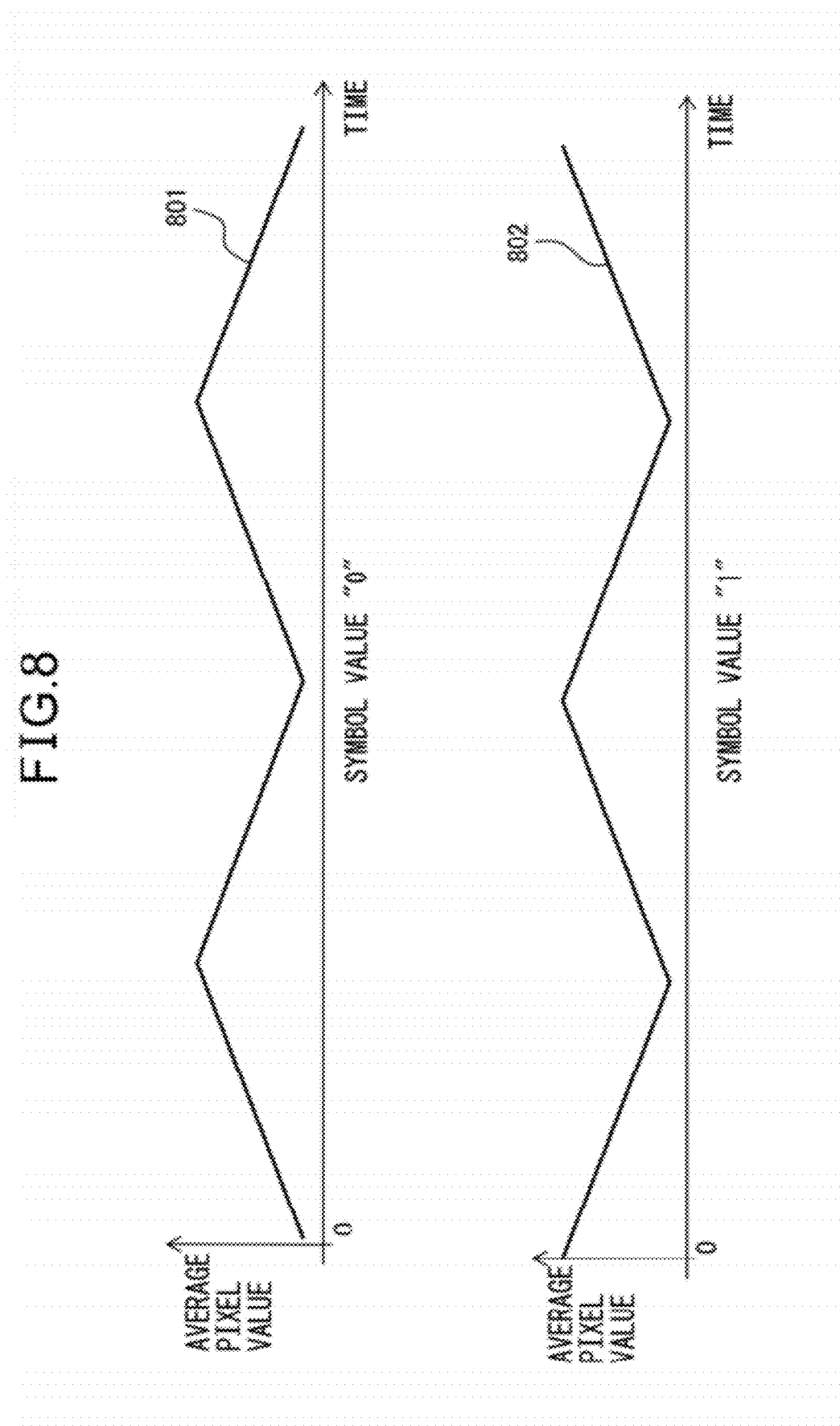
FIG. 8 is a diagram illustrating one example of the relationship between the elapsed time of the watermark pattern and the value of embedded symbol.

FIG. 8 is a diagram illustrating one example of the relationship between the elapsed time of the watermark pattern and the value of the embedded symbol. In the upper and lower graphs of FIG. 8, the abscissa represents the time, and the ordinate represents the average pixel value of the reference region. Graphs 801 and 802 depict how the average pixel value of the reference region varies over time when the value of the symbol is "0" or "1", respectively.

In the illustrated example, when the value of the symbol is "0", the average pixel value is lowest (dark) at start time t0, and thereafter changes to light, then to dark, and then to light in a triangular-wave fashion. On the other hand, when the value of the symbol is "1", the average pixel value is highest (light) at start time t0, and thereafter changes to dark, then to light, and then to dark in a triangular-wave fashion. In this way, the temporal variation of the average pixel value when the value of the symbol is "0" is 180° out of phase with respect to the temporal variation of the average pixel value when the value of the symbol is "1".

If the watermark pattern contains shaded watermark blocks, the average pixel value is highest when the area of the watermark pattern is smallest. Accordingly, when the average pixel value changes from light to dark and then to light, the area of the watermark pattern changes from smallest to largest and then to smallest in this order. Conversely, if the watermark pattern contains spotlight-like watermark blocks, the average pixel value is highest when the area of the watermark pattern is largest. Accordingly, when the average pixel value changes from light to dark and then to light, the area of the watermark pattern changes from largest to smallest and then to largest in this order.

The phase difference between the temporal variation of the average pixel value for one symbol value and that for the other symbol value need not necessarily be made equal to 180° but need only be made large enough that the digital watermark detection apparatus can detect the phase difference.

Figure 9:
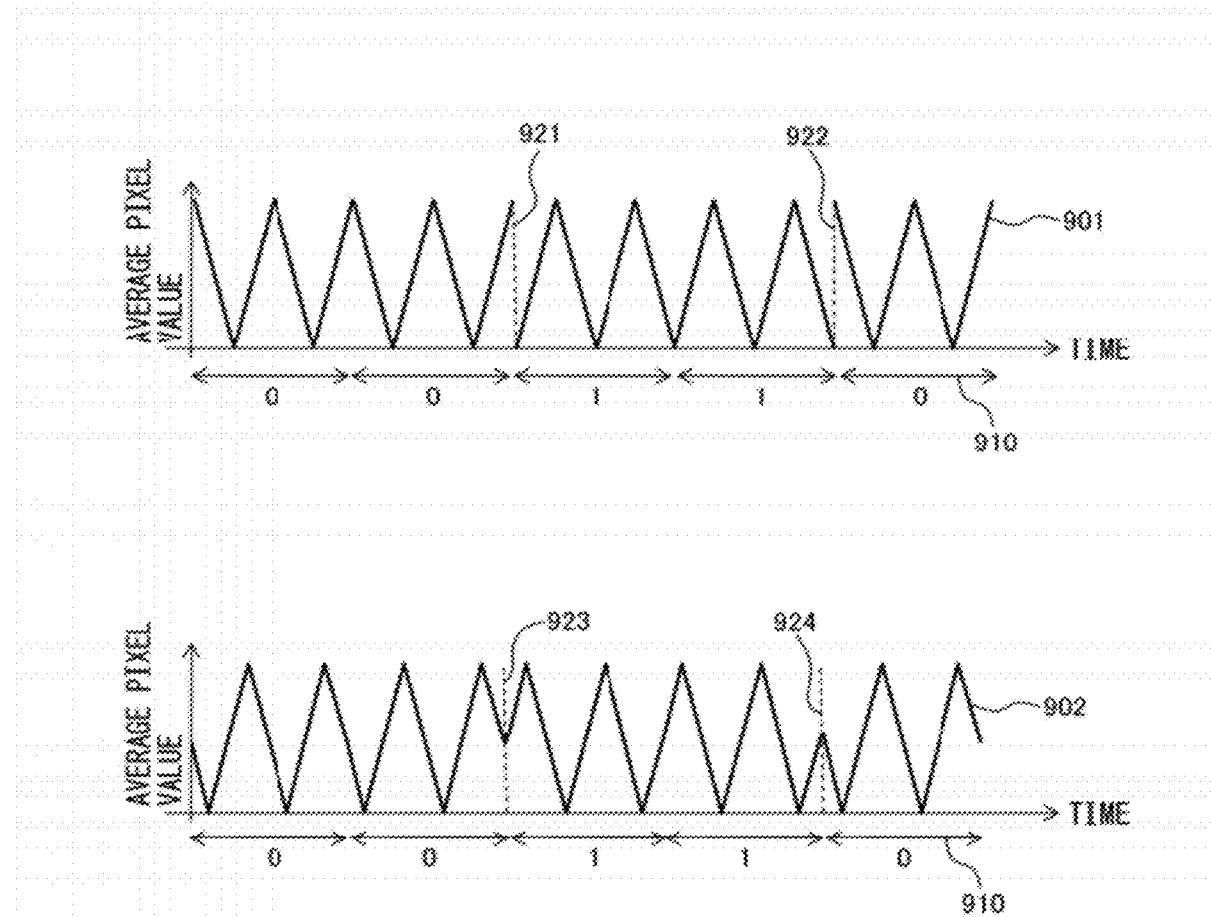
FIG. 9 is a diagram illustrating another example of the relationship between the elapsed time of the watermark pattern and the value of embedded symbol.

FIG. 9 is a diagram illustrating another example of the relationship between the elapsed time of the watermark pattern and the value of the embedded symbol. In the upper and lower graphs of FIG. 9, the abscissa represents the time, and the ordinate represents the average pixel value of the reference region. Graphs 901 and 902 each depict how the average pixel value of the reference region varies over time when the phase difference between the temporal change of the average pixel value of the reference region for one symbol value and that for the other symbol value is 180°. Each double-headed arrow 910 substantially parallel to the abscissa represents a time segment corresponding to one symbol, and the numeric value underneath each arrow indicates the value of the symbol in that time segment.

The graph 901 exhibits a large gap at boundaries 921 and 922 where the symbol changes between "0" and "1". In view of this, by shifting the phase of the triangular wave by 90° for each of the symbols "0" and "1", as depicted by the graph 902, the watermark pattern generating unit 21 can make the average pixel value change smoothly across the boundaries 923 and 924 where the symbol value changes. The watermark pattern generating unit 21 can thus make the change in the symbol value not readily perceptible to the viewer. In the graph 902 also, the phase difference between the triangular waves for the symbols "0" and "1" is maintained at 180°.

Alternatively, the period of the variation of the area of the watermark pattern, that is, the period of the variation of the average pixel value in the reference region, may be changed according to the value of the symbol.

Figure 10:
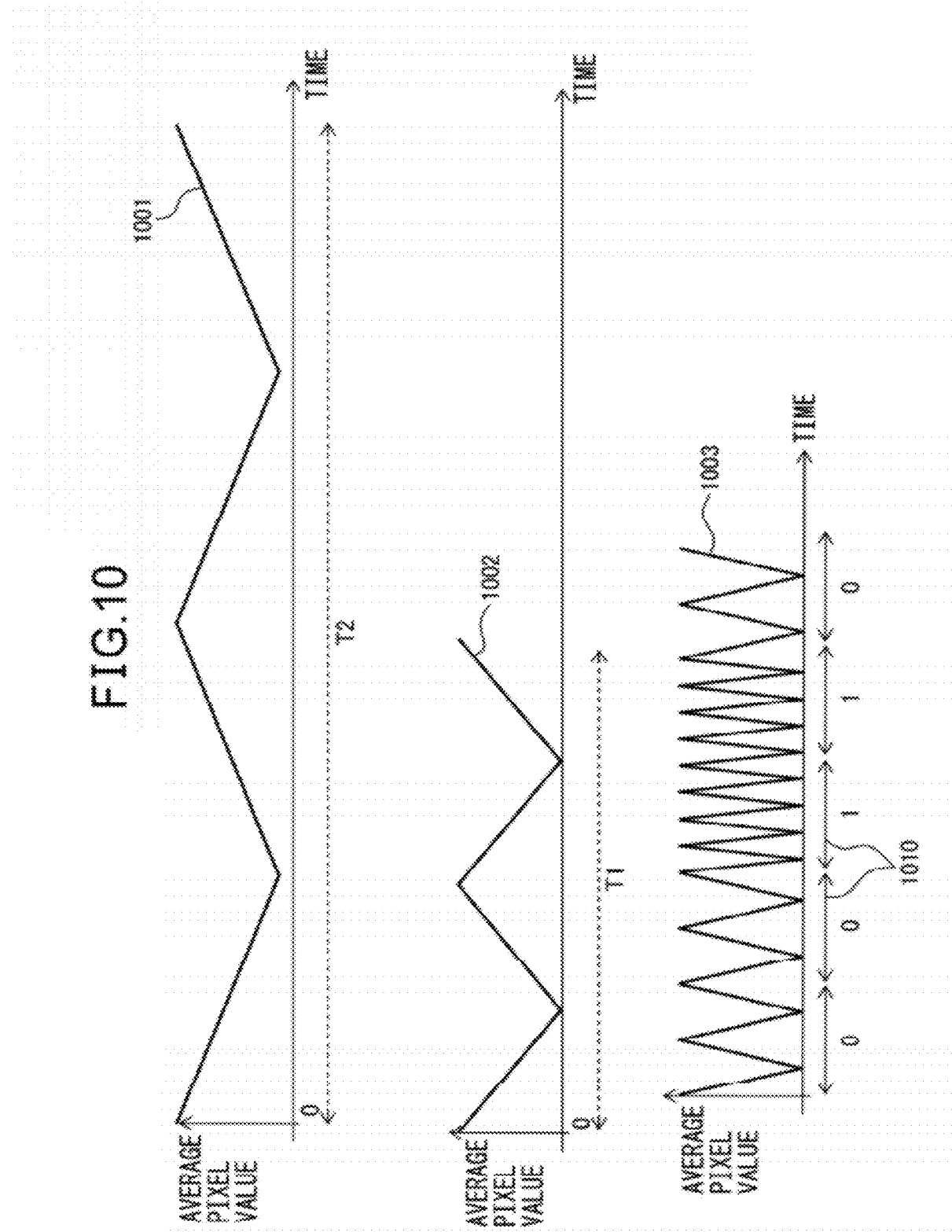
FIG. 10 is a diagram illustrating still another example of the relationship between the elapsed time of the watermark pattern and the value of embedded symbol.

FIG. 10 is a diagram illustrating still another example of the relationship between the elapsed time of the watermark pattern and the value of the embedded symbol. In the upper, middle, and lower graphs of FIG. 10, the abscissa represents the time, and the ordinate represents the average pixel value of the reference region. Graphs 1001 and 1002 depict how the average pixel value of the reference region varies over time when the value of the symbol is "0" or "1", respectively. In the illustrated example, the period T1 for the symbol value "1" is one half the period T2 for the symbol value "0". Accordingly, if it is assumed that the period T2 is made up of eight images as depicted, for example, in FIG. 3, then the period T1 is made up of four images. In this example also, it is preferable that the length of the time segment where each symbol is embedded is made the same, regardless of the value of the symbol, in order to facilitate the detection of the embedded value. For example, as illustrated in FIG. 10 by the graph 103 which depicts the temporal variation of the average pixel value of the reference region for a plurality of symbols, when the symbol value is "0", each time segment 1010 is made up of two periods of the variation of the average pixel value; on the other hand, when the symbol value is "1", each time segment 1010 is made up of four periods of the variation of the average pixel value.

The watermark pattern generating unit 21 passes the watermark pattern determined for each image to the watermark pattern superimposing unit 22.

The watermark pattern superimposing unit 22 identifies the reference region for each image. Then, the watermark pattern superimposing unit 22 corrects the value of each pixel contained in a region that overlaps a particular watermark block of the watermark pattern within the reference region, by using the value of the corresponding pixel contained in that watermark block. For example, if each pixel contained in the watermark block has a value "−2", the watermark pattern superimposing unit 22 subtracts "2" from the value of each pixel contained in the region that overlaps the watermark block. Conversely, if each pixel contained in the watermark block has a value "2", the watermark pattern superimposing unit 22 adds "2" to the value of each pixel contained in the region that overlaps the watermark block.

As described above, the watermark pattern superimposing unit 22 can embed a plurality of symbols in the video data along the direction of time series. In this case, each time the time segment corresponding to one symbol embedded in the video data ends, a prescribed pattern indicating a symbol boundary may be superimposed on the image that lasts until the time segment corresponding to the next symbol begins.

The watermark pattern superimposing unit 22 stores the image with the watermark pattern superimposed thereon in the storage unit 12. Alternatively, the watermark pattern superimposing unit 22 may output the image with the watermark pattern superimposed thereon to another apparatus via the interface unit 11.

Figure 11:
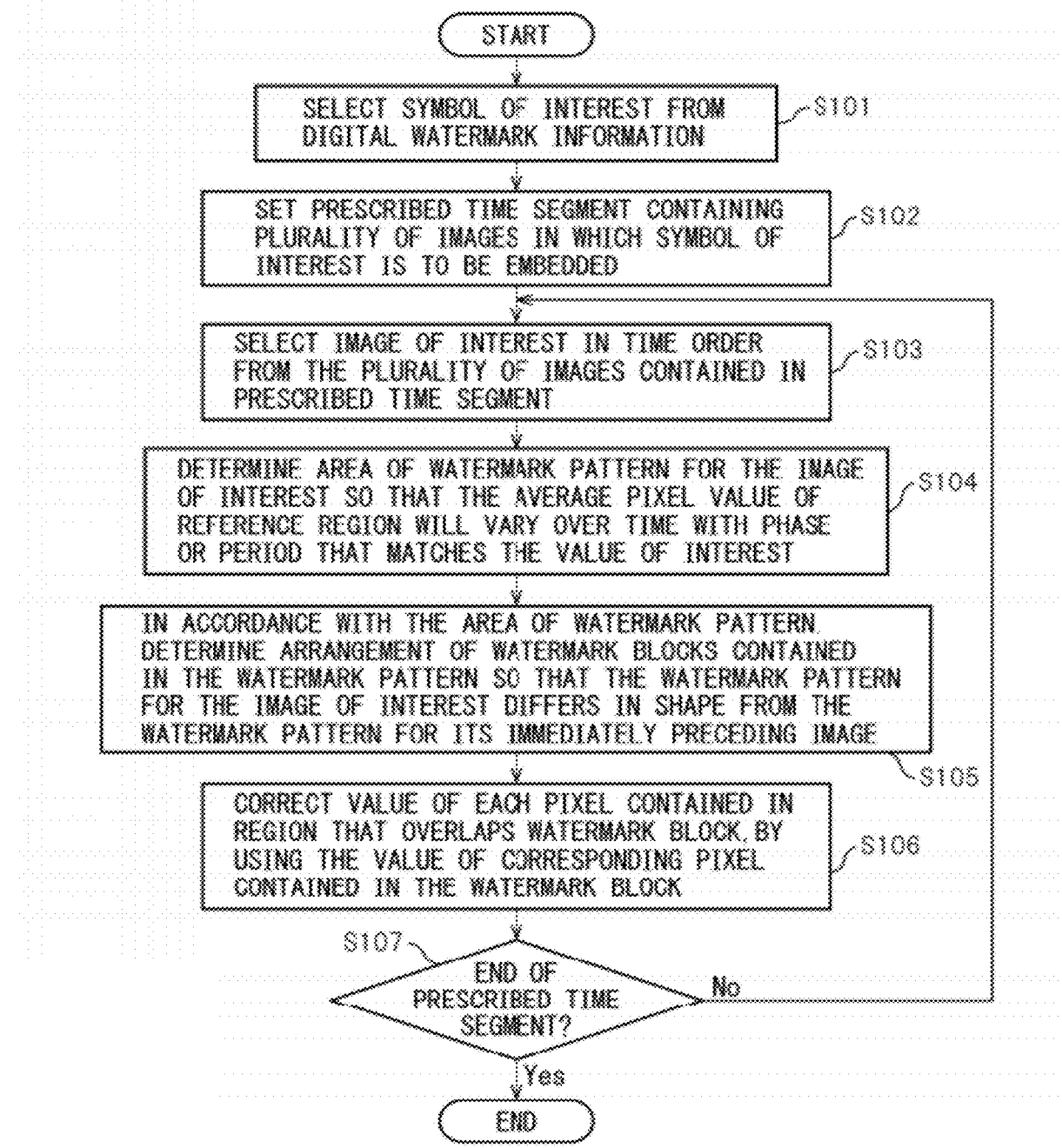
FIG. 11 is an operation flowchart illustrating a digital watermark embedding process which is controlled by a computer program executed on the processing unit in the digital watermark embedding apparatus according to the first embodiment.

FIG. 11 is an operation flowchart illustrating a digital watermark embedding process which is controlled by a computer program executed on the processing unit in the digital watermark embedding apparatus according to the present embodiment. The processing unit 13 carries out the following digital watermark embedding process for each symbol contained in the digital watermark information.

The processing unit 13 selects a symbol of interest from among the symbols contained in the digital watermark information received via the interface unit 11 (step S101). Then, the watermark pattern generating unit 21 in the processing unit 13 sets in the video data a prescribed time segment containing a plurality of images in which the symbol of interest is to be embedded (step S102).

The watermark pattern generating unit 21 selects an image of interest in time order from the plurality of images contained in the prescribed time segment (step S103). Then, the watermark pattern generating unit 21 determines the area of the watermark pattern to be superimposed on the image of interest so that the average pixel value of the reference region will vary over time with a phase or period that matches the value of interest (step S104). The watermark pattern generating unit 21 determines the number of watermark blocks to be contained in the watermark pattern in accordance with the area of the watermark pattern. Further, the watermark pattern generating unit 21 determines the arrangement of the watermark blocks for the image of interest so that the watermark pattern for the image of interest differs in shape from the watermark pattern for its immediately preceding image (step S105). Then, the watermark pattern generating unit 21 passes the watermark pattern to the watermark pattern superimposing unit 22.

The watermark pattern superimposing unit 22 corrects the value of each pixel contained in the region that overlaps each watermark block, by using the value of the corresponding pixel contained in that watermark block (step S106).

After that, the processing unit 13 determines whether the prescribed time segment has ended or not (step S107). If the prescribed time segment has not ended yet (No in step S107), the processing unit 13 repeats the process from step S103 to step S107. On the other hand, if the prescribed time segment has ended (Yes in step S107), the processing unit 13 proceeds to perform the watermark embedding process for the next symbol contained in the digital watermark information. The symbol length and the number of times of symbol embedding are predetermined, and the processing unit 13 repeats the embedding process until the predetermined number of times is reached. Alternatively, the processing unit 13 may repeat the embedding process until as many symbols are embedded as the length of the moving image allows.

As described above, according to the digital watermark embedding apparatus of the present embodiment, the area of the watermark pattern to be superimposed on the image is periodically varied, thereby periodically varying the average pixel value of the reference region, and the period or phase of the temporal variation of the average pixel value represents the value of the embedded symbol. As a result, the digital watermark embedding apparatus can set the value of each pixel contained in the watermark pattern to a small constant value. Accordingly, the digital watermark embedding apparatus not only can minimize, regardless of the image contained in the video data, the degradation of the picture quality of the video data that may occur due to the watermark information embedded in the video data, but can also make it difficult for the viewer to visually recognize the embedded digital watermark. Furthermore, since the shape of the watermark pattern to be superimposed is made different for each image in order to prevent the watermark pattern from being always superimposed on the same particular region, the digital watermark embedding apparatus can make it more difficult for the viewer to visually recognize the embedded digital watermark.

The digital watermark embedding apparatus can determine whether the digital watermark information is embedded or not, by merely detecting whether the average pixel value of the reference region is periodically varying or not from the video data in which the digital watermark information is embedded. As a result, if the video data in which the digital watermark information is embedded is copied by means of analog capture, the digital watermark information remains intact as long as the reference region remains in the image of the copied video data.

According to an another embodiment, the digital watermark embedding apparatus may embed a plurality of symbols contained in the digital watermark information into each image in the video data. In this case, a plurality of reference regions and a plurality of watermark patterns to be contained in the respective reference regions are set for each image in the video data. Each reference region and the watermark pattern superimposed within that reference region correspond to one symbol. Further, if all the symbols contained in the digital watermark information are to be embedded in each image, the prescribed time segment may be set to start at the first image and end at the final image in the video data.

The temporal variation of the area of the watermark pattern is not limited to the triangular wave-like variation. According to an alternative embodiment, the watermark pattern generating unit may determine the area of the watermark pattern to be superimposed on each image so that a particular frequency component of the temporal variation of the area of the watermark pattern has an intensified value. For example, the watermark pattern generating unit may determine the area of the watermark pattern to be superimposed on each image so that the area of the watermark pattern varies sinusoidally with time.

According to another modified example, one symbol may have three or more possible values. In this case, the value of one symbol is determined, for example, by a combination of the phase and period of the variation of the average pixel value of the reference region. For example, the phase that maximizes the average pixel value of the reference region in the first image contained in a given time segment where one symbol is embedded is designated as "positive", and the phase that minimizes the average pixel value of the reference region in the first image contained in that time segment is designated as "negative". Further, when the temporal variation of the average pixel value has a first period, the temporal variation is designated as "short", and when the temporal variation of the average pixel value has a second period longer than the first period, the temporal variation is designated as "long". It is assumed here that the symbol in one period can have one of four possible values "0", "1", "2", and "3". In this case, the watermark pattern generating unit assigns the values "0" to "3", for example, to the phase/period combinations "positive/short", "negative/short", "positive/long", and "negative/long", respectively.

According to still another modified example, when each symbol is a bit, and the digital watermark information is represented by a bit sequence, the processing unit in the digital watermark embedding apparatus may apply error correction encoding to the bit sequence by using an error-correcting code or an error-detecting code. Then, the processing unit may embed the error-correction encoded symbol pattern into the video data. For example, the processing unit may use a cyclic redundancy check code (CRC) as an example of the error-correcting code. In this case, the processing unit may convert the bit sequence contained in the digital watermark information into a CRC code and embed the CRC code into the video data. The average pixel value of the reference region need only be made to vary differently according to the embedded symbol value. When a plurality of CRC encoded symbols are embedded in each image, the digital watermark detection apparatus can determine the value of each embedded symbol without knowledge of the relationship between the phase or period of the temporal variation of the average pixel value of the reference region for the symbol and the value of the symbol. The digital watermark detection apparatus determines that the embedded value is the value that yields a residue "0" when the bit sequence extracted from the video data is divided by the same generating polynomial used to generate the CRC code.

For example, if it is assumed that the generating polynomial as the divisor is "1011" and that a sequence "111011" is contained in the digital watermark information, then the CRC code corresponding to that bit sequence is given as "1110011010".

In this case, from the video data in which the digital watermark information is embedded, the digital watermark detection apparatus obtains the phase or period of the temporal variation of the average pixel value of the reference region corresponding to each bit. Then, the digital watermark detection apparatus obtains two bit sequences "1110011010" and "0001100101" by assigning different symbol values to different phases or periods. Next, to determine whether the bit sequence extracted from the video data is "1110011010" or "0001100101", the digital watermark detection apparatus divides each of the two bit sequences by the divisor "1011". The digital watermark detection apparatus can then determine that "1110011010" that yields a residue "0" is the embedded bit sequence and, by removing the check bits "010" from that bit sequence, can obtain the embedded bit sequence.

According to a further modified example, the digital watermark embedding apparatus embeds the digital watermark information so that the digital watermark detection apparatus can identify the phase of the periodic temporal variation of the average pixel value of the reference region corresponding to the symbol value embedded in each image. For that purpose, the digital watermark embedding apparatus may set a plurality of reference regions for each image, and may set one of the reference regions as a specific reference region. Then, the watermark pattern generating unit in the processing unit determines the watermark pattern for the specific reference region so that the average pixel value of the specific reference region always varies with a constant period. The watermark pattern that is set for the specific reference region is hereinafter called the "reference pattern".

The watermark pattern generating unit determines the watermark pattern so that the temporal variation of the average pixel value of any other reference region to which an embedded symbol is assigned will also have the same period as the reference pattern. Further, the watermark pattern generating unit determines the phase difference between the temporal variation of the area of the watermark pattern and the temporal variation of the area of the reference pattern, i.e., the temporal variation of the average pixel value of the reference region and the temporal variation of the average pixel value of the specific reference region, according to the value of the embedded symbol. For example, when the value of the symbol is "0", the watermark pattern generating unit generates the watermark pattern so that the phase of the temporal variation of the average pixel value of the reference region in which that symbol is embedded matches the phase of the temporal variation of the average pixel value of the specific reference region. On the other hand, when the value of the symbol is "1", the watermark pattern generating unit generates the watermark pattern so that the phase of the temporal variation of the average pixel value of the reference region in which that symbol is embedded is shifted by 90° or 180° with respect to the phase of the temporal variation of the average pixel value of the specific reference region.

According to a still further modified example, provisions may be made so that the watermark pattern generating unit does not use a watermark pattern of the shape that overlaps the entire reference region.

Figure 12:
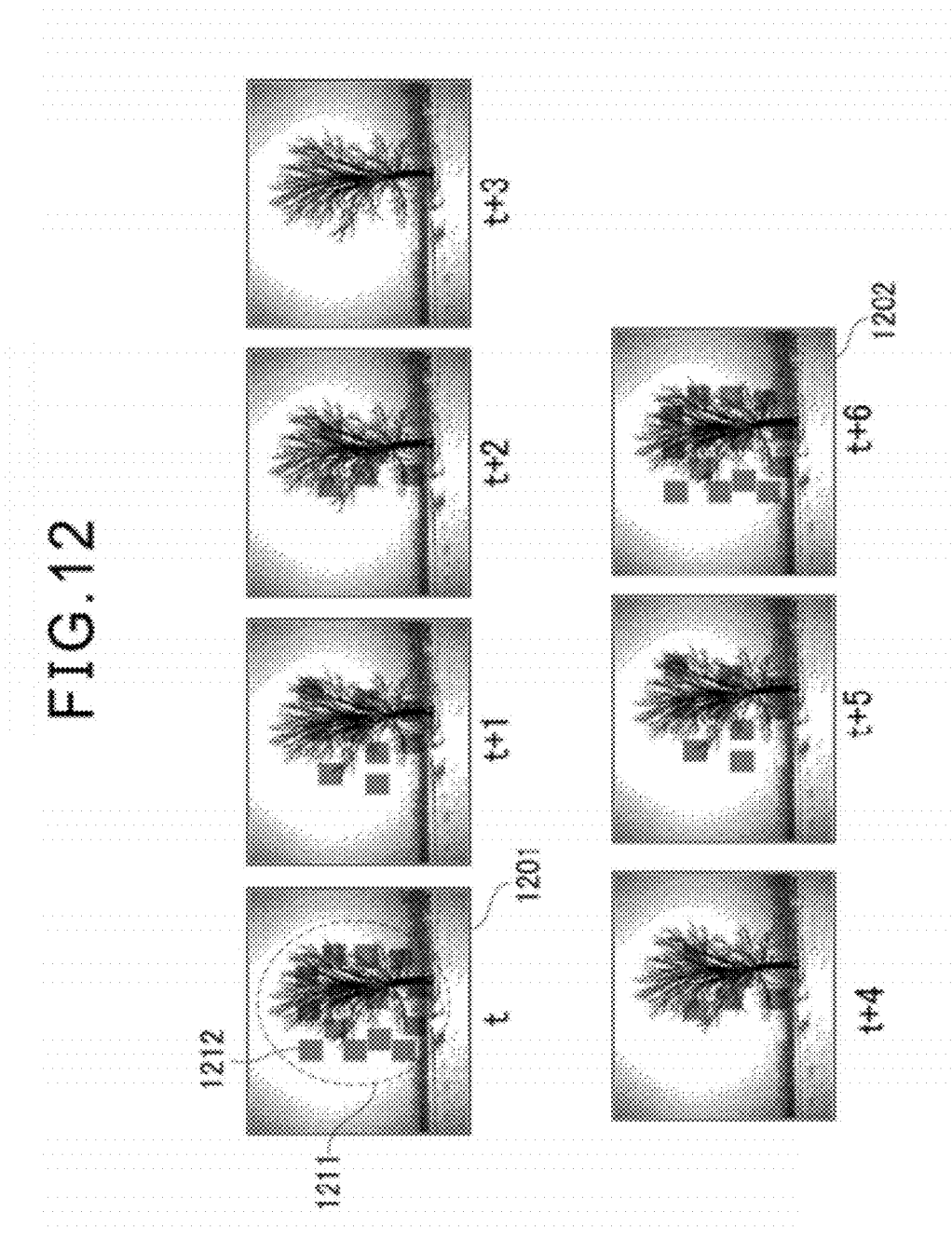
FIG. 12 is a diagram illustrating yet another example of the temporal change of the watermark pattern.

FIG. 12 is a diagram illustrating one example of how the watermark pattern changes over time when provisions are made not to use a watermark pattern of the shape that overlaps the entire reference region. In the illustrated example, each pixel contained in the watermark pattern has a negative value, for example, "−2" as the specific value.

FIG. 12 illustrates seven temporally successive images from time t to time (t+6). A watermark pattern 1211 having the largest area, i.e., the largest number of watermark blocks 1212, is superimposed on the image 1201 at time t. Then, from time t to time (t+3), the area of the watermark pattern decreases, but after time (t+3), the area of the watermark pattern increases. Then, the area of the watermark pattern again becomes largest in the image 1202 at time (t+6). In the illustrated example, neither of the watermark patterns superimposed on the respective images 1201 and 1202 is rectangular in shape, but the plurality of watermark blocks are arranged one spaced apart from another.

In this way, it is preferable to determine the watermark pattern so that, even in the case of the watermark pattern having the largest number of watermark blocks, the watermark pattern does not completely coincide with the reference region and the longest line on the periphery of the watermark pattern is set shorter than a given value. By thus setting the watermark pattern, the boundary of the region on which the watermark pattern is superimposed becomes not readily perceptible even in the case of an image having a background with uniform brightness such as the sky. Accordingly, the digital watermark embedding apparatus can further reduce the degradation of the picture quality of the video data that may occur due to the embedded watermark pattern. The given value is determined empirically, and is set equal to, for example, about one-half to one-third of the width or height of the watermark pattern having the largest area.

Next, a description will be given of the digital watermark detection apparatus that detects the digital watermark information embedded in the video data by the digital watermark embedding apparatus according to the above embodiment or its modified examples.

Figure 13:
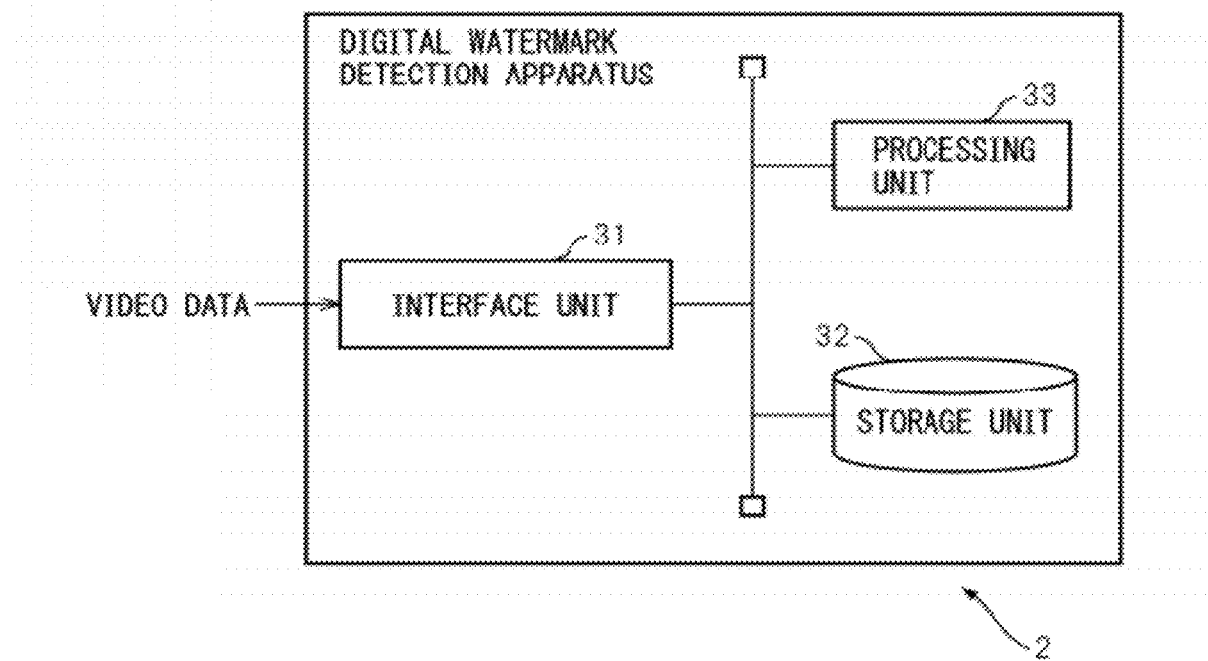
FIG. 13 is a diagram illustrating in simplified form the configuration of a digital watermark detection apparatus according to one embodiment.

FIG. 13 is a diagram illustrating in simplified form the configuration of the digital watermark detection apparatus according to one embodiment. The digital watermark detection apparatus 2 includes an interface unit 31, a storage unit 32, and a processing unit 33. The digital watermark detection apparatus 2 detects the digital watermark information embedded in the video data acquired via the interface unit 31.

The interface unit 31 includes a video signal interface for connecting the digital watermark detection apparatus 2, for example, to a moving image input device such as a camcorder (not depicted), and a control circuit for the video signal interface. Alternatively, the interface unit 31 may include a communication interface for connecting the digital watermark detection apparatus 2 to a communication network conforming to a communication standard such as the Ethernet (registered trademark), and a control circuit for the communication interface.

The interface unit 31 acquires video data from the moving image input device or via the communication network, and passes the video data to the processing unit 33.

The interface unit 31 may also receive the detected digital watermark information from the processing unit 33 and transmit the digital watermark information to other apparatus connected to the digital watermark detection apparatus 2 via the communication network.

The storage unit 32 includes at least one device selected, for example, from among a semiconductor memory device, a magnetic disk device, and an optical disk device. The storage unit 32 stores a computer program to be executed on the digital watermark detection apparatus 2 and various kinds of parameters to be used in order to detect the digital watermark information embedded in the video data. For example, the storage unit 32 stores the position and range of the reference region defined on the image and a mapping table that provides a mapping between the embedded value and the phase or period of the temporal variation of the average pixel value of the reference region. The storage unit 32 may also store the detected digital watermark information. The storage unit 32 may further store the video data in which the digital watermark information is embedded.

The processing unit 33 includes one or a plurality of processors, a memory circuit such as a random access memory, and their peripheral circuitry. The processing unit 33 detects the digital watermark information embedded in the video data. Further, the processing unit 33 controls the entire operation of the digital watermark detection apparatus 2.

Figure 14:
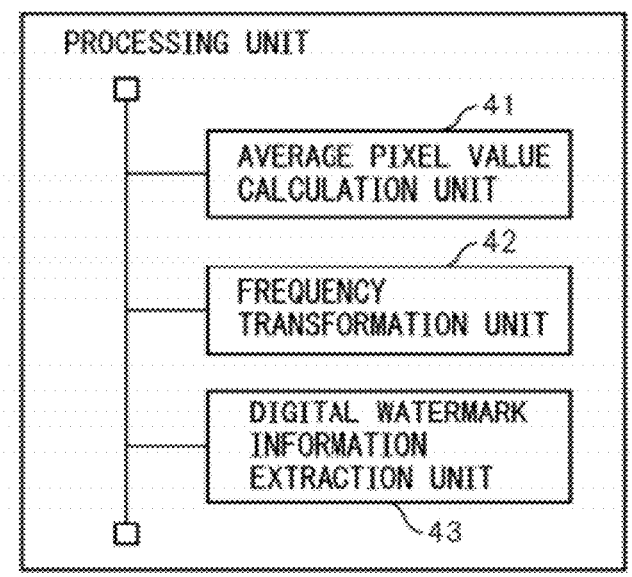
FIG. 14 is a block diagram illustrating the functions that a processing unit in the digital watermark detection apparatus implements in order to detect the digital watermark information on the video data.

FIG. 14 is a block diagram illustrating the functions that the processing unit implements in order to detect the digital watermark information on the video data.

The processing unit 33 includes an average pixel value calculation unit 41, a frequency transformation unit 42, and a watermark information extraction unit 43. The processing unit 33 acquires video data via the interface unit 31 from a camcorder that captured the video data in which the digital watermark information is embedded or from some other apparatus that stores the video data. Then, the processing unit 33 detects the embedded digital watermark information by analyzing the video data.

The average pixel value calculation unit 41 receives the images contained in the video data, in which the digital watermark information is embedded, from the processing unit 33 in time series order. Then, the average pixel value calculation unit 41 calculates the average pixel value for the reference region in each image. If a plurality of reference regions are set for each image, the average pixel value calculation unit 41 calculates the average pixel value for each reference region.

If the video data is analog-captured video obtained by capturing not only the video in which the digital watermark information is embedded but also the background, etc. on the original video, the average pixel value calculation unit 41 may calculate the average pixel value from all the analog-captured video. Alternatively, the average pixel value calculation unit 41 may detect the moving image region containing the original video by applying edge detection to each image. In this case, the average pixel value calculation unit 41 detects the reference region within the moving image region. Further, in this case, the average pixel value calculation unit 41 detects edges on each image by using, for example, a Sobel filter or a Laplacian filter. Then, the average pixel value calculation unit 41 determines that, of the edges extending substantially in the horizontal direction, for example, the longest edge in the upper half of the image represents the upper edge of the moving image region containing the original video. Likewise, the average pixel value calculation unit 41 determines that, of the edges extending substantially in the horizontal direction, the longest edge in the lower half of the image represents the lower edge of the moving image region. Further, the average pixel value calculation unit 41 determines that, of the edges extending substantially in the vertical direction, for example, the longest edge in the left half of the image represents the left edge of the moving image region, and the longest edge in the right half of the image represents the right edge of the moving image region. If the length of the longest edge extending substantially in the horizontal direction in the upper half of the image is, for example, one half or less of the horizontal width of the image, the average pixel value calculation unit 41 may determine that the upper edge of the image corresponds to the upper edge of the moving image region. Further, if the length of the longest edge extending substantially in the horizontal direction in the lower half of the image is, for example, one half or less of the horizontal width of the image, the average pixel value calculation unit 41 may determine that the lower edge of the image corresponds to the lower edge of the moving image region. Likewise, if the length of the longest edge extending substantially in the vertical direction in the left half or right half of the image is, for example, one half or less of the vertical height of the image, the average pixel value calculation unit 41 may determine that the left edge or right edge of the image corresponds to the left edge or right edge of the moving image region, respectively.

The average pixel value calculation unit 41 determines the upper edge of the reference region so that the ratio of the distance between the upper edge of the moving image region and the upper edge of the reference region to the height of the moving image region becomes identical with the corresponding ratio in the analog-captured original video. Likewise, the average pixel value calculation unit 41 can determine any other edge of the reference region so that the ratio of the distance between the corresponding edges of the moving image region and the reference region to the height or width of the moving image region becomes identical with the corresponding ratio in the original video.

The average pixel value calculation unit 41 passes the average pixel value of the entire image or the average pixel value of the reference region obtained for each image to the frequency transformation unit 42.

The frequency transformation unit 42 creates a one-dimensional vector by arranging the average pixel value for each reference region or for the entire image in time series order. Then, by frequency-transforming the one-dimensional vector for each time segment corresponding to one symbol value, the frequency transformation unit 42 obtains a spectrum representing the temporal variation of the average pixel value in that time segment. The frequency transformation is performed using, for example, a fast Fourier transform or a discrete cosine transform. The frequency transformation unit 42 can identify each time segment by detecting a prescribed pattern indicating the time segment boundary by using, for example, a technique of pattern matching.

The frequency transformation unit 42 passes the spectrum representing the temporal variation of the average pixel value for each time segment, obtained for each reference region or for the entire image, to the watermark information extraction unit 43.

Based on the spectrum representing the temporal variation of the average pixel value for each time segment, obtained for each reference region or for the entire image, the watermark information extraction unit 43 extracts the digital watermark information embedded in the video data.

The average pixel value of the reference region also varies over time, unless the video captured in the image in which the digital watermark information is embedded is a still image.

Figure 15A:
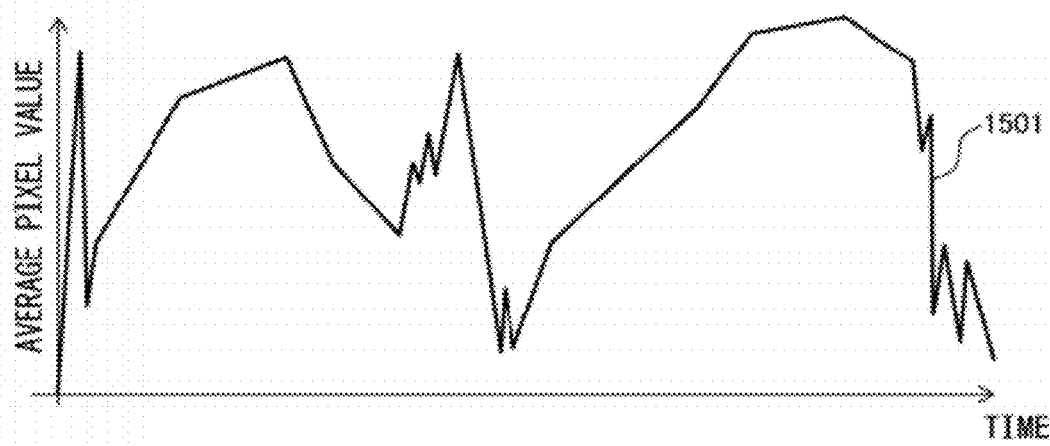
FIG. 15A is a diagram illustrating one example of the temporal variation of the average pixel value of the reference region.

FIG. 15A is a diagram illustrating one example of the temporal variation of the average pixel value of the reference region. In FIG. 15A, the abscissa represents the time, and the ordinate represents the pixel value. Graph 1501 in FIG. 15A depicts one example of how the average pixel value of the reference region varies over time when the image in the reference region changes as the time elapses. There are cases where the variation in the average pixel value of the reference region is largely attributable to the image in the reference region, rather than the variation in the area of the watermark pattern. In such cases, as can be seen from the graph 1501, it is difficult to extract the variation components of the average pixel value associated with the variation of the area of the watermark pattern directly from the temporal variation of the average pixel value.

However, the frequency representing the temporal variation of the average pixel value of the reference region due to the variation of the area of the watermark pattern is known in advance. For example, when the average pixel value of the reference region varies over time in a triangular-wave fashion, as described earlier, the frequency of the average pixel value along the time axis direction contains frequency components corresponding to the triangular wave.

Figure 15B:
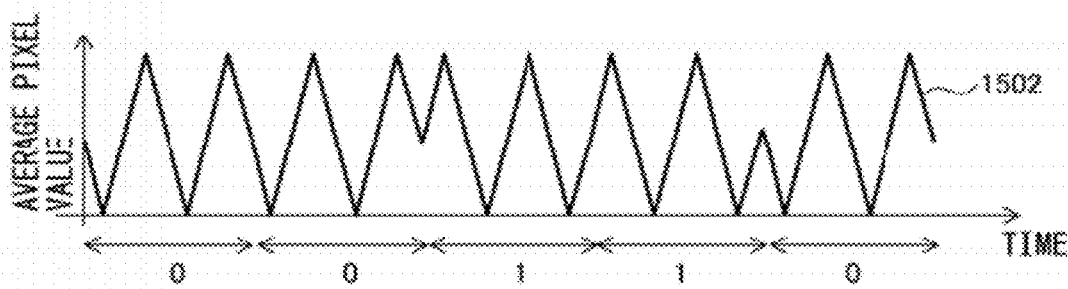
FIG. 15B is a diagram schematically illustrating the temporal variation of the average pixel value obtained by performing an inverse frequency transform on the frequency components corresponding to a triangular wave that are extracted from the spectrum obtained by frequency-transforming the temporal variation of the average pixel value depicted in FIG. 15A.

FIG. 15B is a diagram schematically illustrating the temporal variation of the average pixel value obtained by performing an inverse frequency transform on the frequency components corresponding to the triangular wave that are extracted from the spectrum obtained by frequency-transforming the temporal variation of the average pixel value depicted in FIG. 15A. In FIG. 15B, the abscissa represents the time, and the ordinate represents the pixel value. Graph 1502 in FIG. 15B depicts the temporal variation of the pixel value obtained by applying an inverse frequency transform only to the frequency components corresponding to the triangular wave. As can be seen from the graph 1502, by extracting only the frequency components due to the variation of the area of the watermark pattern, only the periodic temporal variation components of the average pixel value of the reference region due to the variation of the area of the watermark pattern are extracted. When detecting the digital watermark from the analog-captured video containing the background, etc., the watermark information extraction unit 43 uses not only the reference region but also the entire image containing noise such as the background; if the period of the variation of the area of the watermark pattern is different from that of the background, the symbol can be detected.

In view of this, the watermark information extraction unit 43 extracts only the frequency components corresponding to the temporal variation of the average pixel value associated with the periodic variation of the area of the watermark pattern, from the spectrum obtained for each time segment for each reference region or for the entire image. Then, when the value of the embedded symbol is represented by the phase of the temporal variation of the average pixel value, the watermark information extraction unit 43 obtains phase information from the extracted frequency components. Then, the watermark information extraction unit 43 obtains the value of the symbol corresponding to that phase, for example, by referring to a mapping table providing the mapping between the phase and the symbol value.

Alternatively, the value of the symbol may be determined by the phase difference between the temporal variation of the average pixel value of the reference region and the temporal variation of the average pixel value of the specific reference region, as previously described. In this case, the watermark information extraction unit 43 extracts the frequency components associated with the variation of the area of the watermark pattern from the spectra for the reference region and the specific reference region, respectively. Then, the watermark information extraction unit 43 obtains the phases of the frequency components extracted for the reference region and the specific reference region, respectively, and calculates the difference between the phase in the reference region and the phase in the specific reference region. The watermark information extraction unit 43 retrieves from the storage unit 32 a mapping table providing the mapping between the phase difference and the symbol value. The watermark information extraction unit 43 refers to the mapping table and determines that the symbol value corresponding to the detected phase difference is the value of the embedded symbol.

Alternatively, if the bit sequence representing the digital watermark information embedded in the video data is error-correction encoded using a CRC code, the watermark information extraction unit 43 computes possible symbol patterns for each reference region from the phase of the temporal variation of the average pixel value for each time segment. For example, if the symbol is a bit, the watermark information extraction unit 43 creates two patterns assuming that the symbol in each time segment is "0" or "1", respectively, for the same phase. Then, the watermark information extraction unit 43 selects the symbol pattern that is judged to be error free by a CRC check. For example, when the phases in three time segments are different, such as 0°, 180°, and 0°, respectively, the possible symbol patterns are (0, 1, 0) and (1, 0, 1). As earlier described, the determination as to which pattern is the correct symbol pattern can be made by also embedding CRC parity check bits in advance as a watermark symbol and by computing the CRC parity when making a symbol decision.

On the other hand, when the value of the symbol is represented by the period of the temporal variation of the area of the watermark pattern, the watermark information extraction unit 43 obtains the most intense frequency component among the frequency components corresponding to the possible values that the symbol can take, and obtains the period corresponding to the most intense frequency component.

Figure 16A:
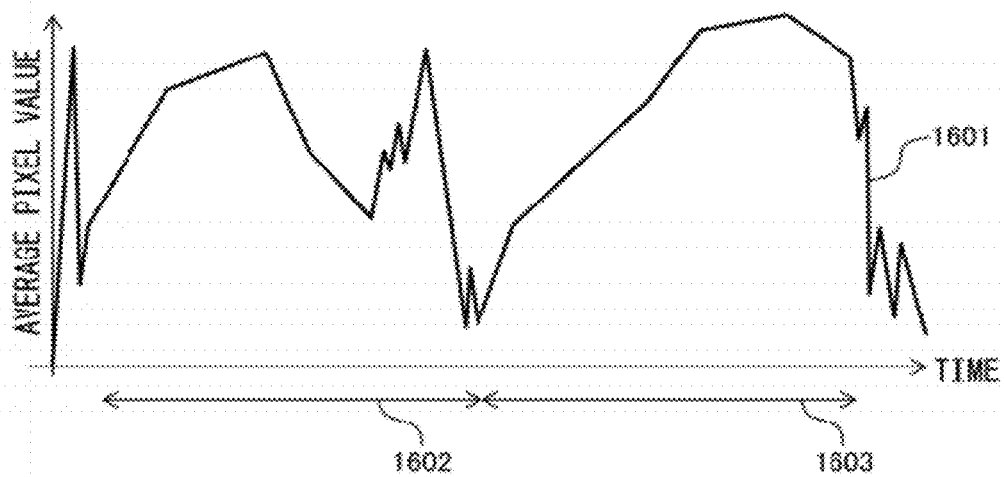
FIG. 16A is a diagram illustrating another example of the temporal variation of the average pixel value of the reference region.

FIG. 16A is a diagram illustrating another example of the temporal variation of the average pixel value of the reference region. In FIG. 16A, the abscissa represents the time, and the ordinate represents the pixel value. Graph 1601 in FIG. 16A depicts one example of how the average pixel value of the reference region varies over time when the image in the reference region changes as the time elapses. Double-headed arrow 1602 and 1603 each represent a time segment in which one symbol is embedded. As can be seen from the graph 1601, it is difficult in each time segment to detect the period of the variation of the average pixel value associated with the variation of the area of the watermark pattern.

Figure 16B:
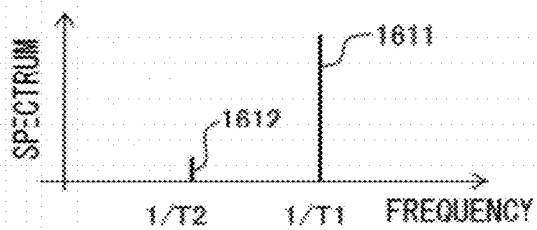
FIG. 16B is a diagram illustrating the frequency components for the period corresponding to each symbol value that are extracted from the spectrum obtained by frequency-transforming, for each time segment, the temporal variation of the average pixel value of the reference region illustrated in FIG. 16A.
Figure 16C:
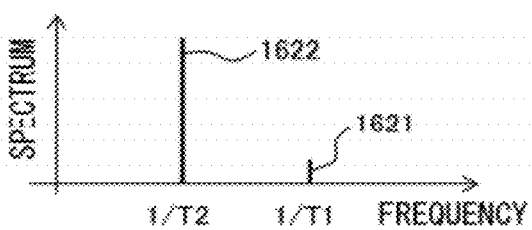
FIG. 16C is a diagram illustrating the frequency components for the period corresponding to each symbol value that are extracted from the spectrum obtained by frequency-transforming, for each time segment, the temporal variation of the average pixel value of the reference region illustrated in FIG. 16A.

FIGS. 16B and 16C are diagrams illustrating the frequency components for the period corresponding to each symbol value that are extracted from the spectrum obtained by frequency-transforming, for each time segment, the temporal variation of the average pixel value of the reference region illustrated in FIG. 16A. In FIGS. 16B and 16C, the abscissa represents the extracted frequency components, and the ordinate represents the intensity of the spectrum. FIG. 16B corresponds to the time segment 1602 in FIG. 16A, and FIG. 16C corresponds to the time segment 1603 in FIG. 16A. The frequency spectrum of a triangular wave contains a plurality of frequency components specific to the period of the triangular wave.

As illustrated in FIG. 16B, in the time segment 1602, the intensity of the frequency component 1611 corresponding to the period T1 is higher than the intensity of the frequency component 1612 corresponding to the period T2. As a result, the watermark information extraction unit 43 deduces that the period of the variation of the area of the watermark pattern is T1. On the other hand, as illustrated in FIG. 16C, in the time segment 1603, the intensity of the frequency component 1622 corresponding to the period T2 is higher than the intensity of the frequency component 1621 corresponding to the period T1. As a result, the watermark information extraction unit 43 deduces that the period of the variation of the area of the watermark pattern is T2.

The watermark information extraction unit 43 retrieves from the storage unit 32 a mapping table providing the mapping between the period and the symbol value. The watermark information extraction unit 43 refers to the mapping table and determines that the symbol value corresponding to the detected period is the value of the embedded symbol.

The watermark information extraction unit 43 reconstructs the digital watermark information by arranging the values of the extracted symbols in time series order. If a plurality of reference regions are set for each image, and a symbol is embedded in each reference region, the watermark information extraction unit 43 reconstructs the digital watermark information by arranging the symbol values for the respective reference regions in the order in which the symbols are embedded in the image.

FIG. 17 is an operation flowchart illustrating a digital watermark detection process which is controlled by a computer program executed on the processing unit 33 in the digital watermark detection apparatus 2. The processing unit 33 carries out the following process for each symbol contained in the digital watermark information embedded in the video data.

The processing unit 33 selects a plurality of images contained in a prescribed time segment corresponding to one symbol in the video data (step S201). The average pixel value calculation unit 41 in the processing unit 33 calculates, for each selected image, the average pixel value for the reference region or for the entire image (step S202). Then, the average pixel value calculation unit 41 passes the average pixel value to the frequency transformation unit 42.

The frequency transformation unit 42 calculates the spectrum of the temporal variation of the average pixel value by frequency-transforming, for each time segment, the one-dimensional vector created by arranging the average pixel value in time series order (step S203). Then, the frequency transformation unit 42 passes the spectrum to the watermark information extraction unit 43.

The watermark information extraction unit 43 extracts from the spectrum the frequency components associated with the variation of the area of the watermark pattern (step S204). Then, the watermark information extraction unit 43 calculates the phase or period of the extracted frequency components (step S205). The watermark information extraction unit 43 extracts the symbol value corresponding to the calculated phase or period as the value of the embedded symbol (step S206).

The processing unit 33 repeats the digital watermark detection process to obtain the next symbol. After a predetermined number of symbols have been extracted, the processing unit 33 terminates the digital watermark detection process.

If a plurality of reference regions are set for each image, the processing unit 33 repeats steps S202 to S206 for each reference region.

As described above, the digital watermark detection apparatus according to the present embodiment can extract the digital watermark information from the video data in which the digital watermark information was embedded by the digital watermark embedding apparatus according to the foregoing embodiment. Further, the phase or period of the temporal variation of the area of the watermark pattern does not change even when the video data in which the digital watermark information is embedded is captured by analog means. Accordingly, the digital watermark detection apparatus can extract the digital watermark information even from such analog-captured video data.

The video data in which the digital watermark information is embedded by the digital watermark embedding apparatus may be color image data. For example, if the video data has luminance information for each of three colors, red (R), green (G), and blue (B), the digital watermark embedding apparatus according to the embodiment may perform the above digital watermark embedding process on one or two of the three colors or on all the three colors. Alternatively, the digital watermark embedding apparatus may perform the above digital watermark embedding process on the luminance or hue component or on saturation, chromaticity, etc. On the other hand, the digital watermark detection apparatus may perform the above digital watermark detection process on the color or colors for which the digital watermark information is embedded.

The digital watermark embedding apparatus according to the above embodiment is incorporated, for example, in a set-top box, a server, or a personal computer. The apparatus equipped with the digital watermark embedding apparatus performs the above digital watermark embedding process on the video data, i.e., the video content received via the communication network or the antenna, when reproducing the video data. If the video data is data compressed by a prescribed compression scheme, the apparatus decodes each image in the video data in accordance with the prescribed compression scheme. Then, the apparatus stores the images decoded from the video data into its buffer memory in time series order. Next, the apparatus retrieves each image from the buffer memory in time series order, performs the digital watermark embedding process, and causes the display unit to display the image in which the digital watermark information is embedded.

Further, the computer program for causing a computer to implement the various functions of the processing unit in the digital watermark embedding apparatus according to the above embodiment may be provided in the form recorded on a medium readable by the computer. Likewise, the computer program for causing a computer to implement the various functions of the processing unit in the digital watermark detection apparatus according to the above embodiment may be provided in the form recorded on a medium readable by the computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. A digital watermark embedding apparatus comprising:
   an interface circuit which acquires video data and digital watermark information; and
   a processor which embeds the digital watermark information into the video data, wherein
   the processor is adapted to, for each symbol contained in the digital watermark information, set a time segment including a plurality of images contained in the video data, cause the area of a watermark pattern formed by a plurality of pixels having a prescribed value, and superimposed on each image contained in the video data, to vary the area of the watermark pattern in periodic fashion over time in the time segment according to the value of the symbol contained in the digital watermark information, and
   correct, using the prescribed value, the value of each pixel contained in a region where each image in the video data and the watermark pattern corresponding to the each image overlap each other.

2. The digital watermark embedding apparatus according to claim 1, wherein the processor is adapted to perform processing so that the watermark pattern to be superimposed on a first image in the video data differs in shape from the watermark pattern to be superimposed on a second image immediately succeeding the first image in the video data.

3. The digital watermark embedding apparatus according to claim 2, wherein the processor is adapted to determine the shape of the watermark pattern to be superimposed on the second image so that one of the watermark patterns superimposed on the first image and the second image, respectively, will not be contained in the other of the watermark patterns.

4. The digital watermark embedding apparatus according to claim 2, wherein the watermark pattern contains at least one watermark block formed by at least a pixel having the prescribed value, and the area of the watermark pattern increases or decreases as the watermark blocks increase or decreases in number, and wherein
   the processor is adapted to determine an arrangement of the watermark blocks contained in the watermark pattern to be superimposed on the second image so that the arrangement is uncorrelated with the arrangement of the watermark blocks contained in the watermark pattern superimposed on the first image, thereby making the watermark pattern superimposed on the first image and the watermark pattern superimposed on the second image differ in shape from each other.

5. The digital watermark embedding apparatus according to claim 4, wherein the watermark pattern contains at least one first watermark block having a first prescribed value and at least one second watermark block having a second prescribed value different from the first prescribed value, and wherein
   the processor is adapted to perform processing so that the proportion of the number of the second watermark blocks to the number of the first watermark blocks contained in the watermark pattern to be superimposed on the second image differs from the proportion of the number of the second watermark blocks to the number of the first watermark blocks contained in the watermark pattern to be superimposed on the first image.

6. The digital watermark embedding apparatus according to claim 1, wherein the watermark pattern when the area of the watermark pattern is maximized contains a plurality of watermark blocks each formed by a pixel having the prescribed value, and wherein
   the processor is adapted to arrange the plurality of watermark blocks so that, of the plurality of watermark blocks, at least a first watermark block and a second watermark block are spaced apart from each other.

7. The digital watermark embedding apparatus according to claim 1, wherein the processor is adapted to perform processing so that the variation over time of the area of the watermark pattern when the symbol has a first value differs in phase from the variation when the symbol has a second value different from the first value.

8. The digital watermark embedding apparatus according to claim 1, wherein the processor is adapted to perform processing so that the variation over time of the area of the watermark pattern when the symbol has a first value differs in period from the variation when the symbol has a second value different from the first value.

9. A digital watermark embedding method comprising:
   acquiring video data and digital watermark information;
   for each symbol contained in the digital watermark information, setting a time segment including a plurality of images contained in the video data;
   causing the area of a watermark pattern formed by a plurality of pixels having a prescribed value, and superimposed on each image contained in the video data, to vary the area of the watermark pattern in periodic fashion over time in the time segment according to the value of the symbol contained in the digital watermark information; and
   embedding the digital watermark information into the video data by correcting, using the prescribed value, the value of each pixel contained in a region where each image in the video data and the watermark pattern corresponding to the each image overlap each other.

10. A non-transitory computer readable recording medium having a digital watermark embedding computer program recorded thereon for causing a computer to execute the process of embedding digital watermark information into video data, and wherein the program causes the computer to carry out:
    for each symbol contained in the digital watermark information, setting a time segment including a plurality of images contained in the video data;
    causing the area of a watermark pattern formed by a plurality of pixels having a prescribed value, and superimposed on each image contained in the video data, to vary the area of the watermark pattern in periodic fashion over time in the time segment according to the value of the symbol contained in the digital watermark information; and
    embedding the digital watermark information into the video data by correcting, using the prescribed value, the value of each pixel contained in a region where each image in the video data and the watermark pattern corresponding to the each image overlap each other.

11. A digital watermark detection apparatus comprising:
an interface circuit which acquires video data in which digital watermark information is embedded; and
a processor which detects the digital watermark information embedded in the video data, wherein
the processor is adapted to calculate, for each image contained in the video data, an average pixel value for the entire image or for a reference region that contains a watermark pattern whose area varies in periodic fashion over time with a phase or period that matches the value of a symbol contained in the digital watermark information,
calculate a spectrum depicting how the average pixel value varies over time, by frequency-transforming a set including the average pixel value for each image contained in a time segment corresponding to one the symbol and arranged in time series order, and
obtain the value of the symbol by extracting from the spectrum a frequency component corresponding to the periodic variation of the area of the watermark pattern and by calculating from the frequency component the phase or period of the periodic variation of the area of the watermark pattern.

12. A digital watermark detection method comprising:
acquiring video data in which digital watermark information is embedded;
for each image contained in the video data, calculating an average pixel value for the entire image or for a reference region that contains a watermark pattern whose area varies in periodic fashion over time with a phase or period that matches the value of a symbol contained in the digital watermark information;
calculating a spectrum depicting how the average pixel value varies over time, by frequency-transforming a set including the average pixel value for each image contained in a time segment corresponding to one the symbol and arranged in time series order; and
obtaining the value of the symbol by extracting from the spectrum a frequency component corresponding to the periodic variation of the area of the watermark pattern and by calculating from the frequency component the phase or period of the periodic variation of the area of the watermark pattern, and thereby detecting the digital watermark information embedded in the video data.

13. A non-transitory computer readable recording medium having a digital watermark detection computer program recorded thereon for causing a computer to execute the process of detecting digital watermark information embedded in video data, wherein the program causes the computer to carry out:
for each image contained in the video data, calculating an average pixel value for the entire image or for a reference region that contains a watermark pattern whose area varies in periodic fashion over time with a phase or period that matches the value of a symbol contained in the digital watermark information;
calculating a spectrum depicting how the average pixel value varies over time, by frequency-transforming a set including the average pixel value for each image contained in a time segment corresponding to one the symbol and arranged in time series order; and
obtaining the value of the symbol by extracting from the spectrum a frequency component corresponding to the periodic variation of the area of the watermark pattern and by calculating from the frequency component the phase or period of the periodic variation of the area of the watermark pattern, and thereby detecting the digital watermark information embedded in the video data.

* * * * *